United States Patent

[11] 3,592,334

[72] Inventor  Fred J. Fleischauer
               Oakmont, Pa.
[21] Appl. No. 814,784
[22] Filed     Apr. 9, 1969
[45] Patented  July 13, 1971
[73] Assignee  General Logistics Corporation
               Oakmont, Pa.
               Division of Ser. No. 651,082, May 29, 1962,
               Pat. No. 3,477,558, which is a continuation-
               in-part of application Ser. No. 589,945,
               Oct. 27, 1966, now abandoned

[54] DIFFERENTIAL PRESSURE CONVEYORS
     22 Claims, 40 Drawing Figs.
[52] U.S. Cl. ................................................. 198/184,
                                198/195, 271/26, 271/74
[51] Int. Cl. ................................................. B65g 15/00
[50] Field of Search .......................................... 198/193,
                   195, 129, 184; 302/29; 271/74, 35, 34, 26

[56]                References Cited
                UNITED STATES PATENTS
2,584,134   2/1952   Knutson ..................... 198/195 X L
3,081,996   3/1963   Hajos ........................ 271/74
3,069,786  12/1962   Nichols, Jr. .................. 198/204
3,182,998   5/1965   Peterson ..................... 271/74
3,202,302   8/1965   Insolio ....................... 271/74
3,359,648  12/1967   Overly et al. ................ 271/74
3,186,326   6/1965   Schmidt ...................... 271/74
3,237,753   3/1966   Allen et al. .................. 198/129

Primary Examiner—Evon C. Blunk
Assistant Examiner—H. S. Lane
Attorney—Buell, Blenko & Ziesenheim ABSTRACT: The present invention utilizes air float and vacuum support principles in general conveying or transporting of articles, without the use of high differential pressures, movable vacuum heads, and large leakage rate. The principles of the invention are adaptable to a variety of general conveying operations such as elevated or overhead conveying, elevating, diverting, unscrambling, stacking, unstacking, palletizing, accumulation and alignment. The invention also provides a foraminous conveyor with means for controlling leakage rates therethrough, and novel conveyor structures for supporting and moving the foraminous belt without extensive contact with apertured slide surfaces. In some cases the vacuum or air lift conveyor can be hooded, with the hood coupled to the blower inlet or outlet as the case may be, in order to increase the pressure differential across the foraminous belt and to reduce the volumetric load on the blower. Certain of the vacuum conveyor arrangements are shaped to engage irregular objects and/or are provided with novel release mechanisms to quickly equalize the differential pressures across the belt in order to release articles adhered thereto. Novel mechanisms are provided for cleaning the foraminous belt for either vacuum or air lift conveyors described herein. When a variety of articles are transferred by the air lift or vacuum conveyor, a discriminator and time delay circuit can be associated therewith for discharging the conveyed articles selectively to preselected discharges stackers or cross conveyors. Novel lateral seals are provided for sealing the edges of the foraminous belt to the pressure chamber in either of the air lift or vacuum conveyors. A novel depalletizer including a horizontally movable delivery plate having an inclined edge is associated with a vacuum conveyor and with an alignment conveyor. Another novel depalletizer, wherein the indexing requirement of conventional depalletizers is eliminated, is associated with a lifting feature of the vacuum conveyor.

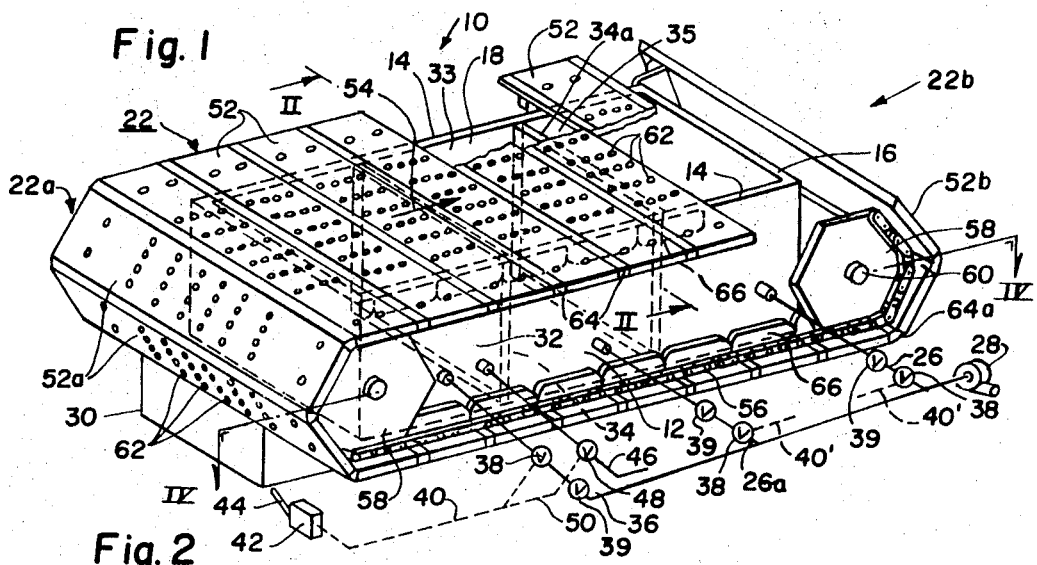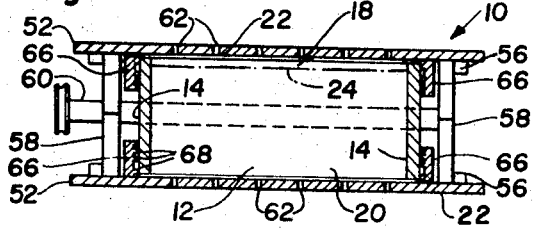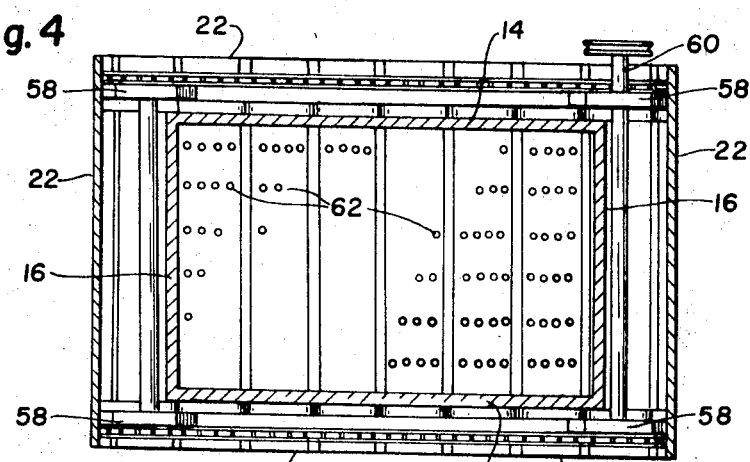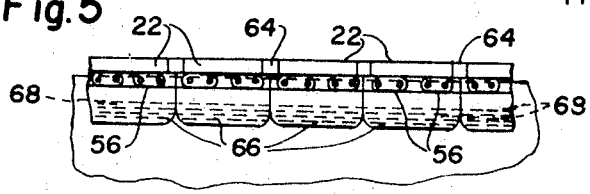

INVENTOR
FRED J. FLEISCHAUER

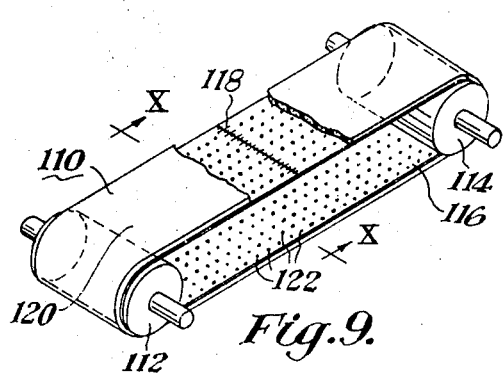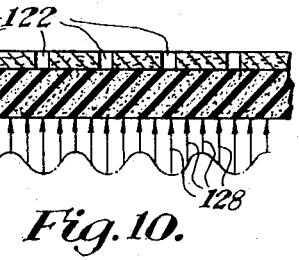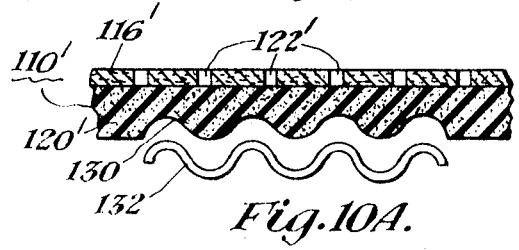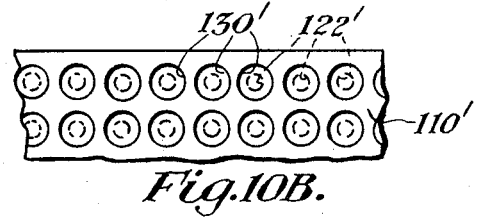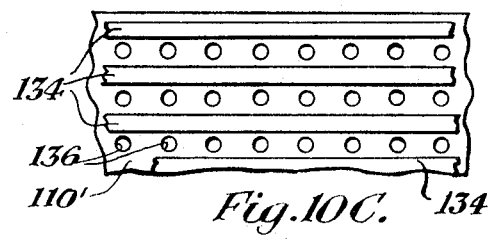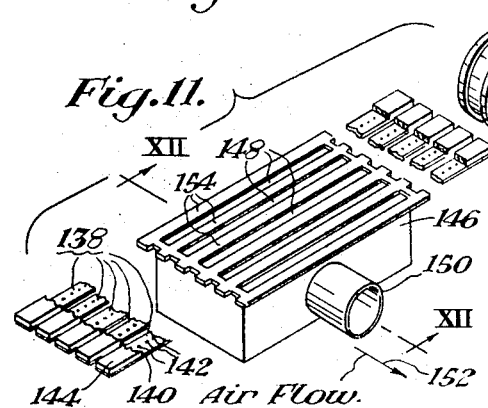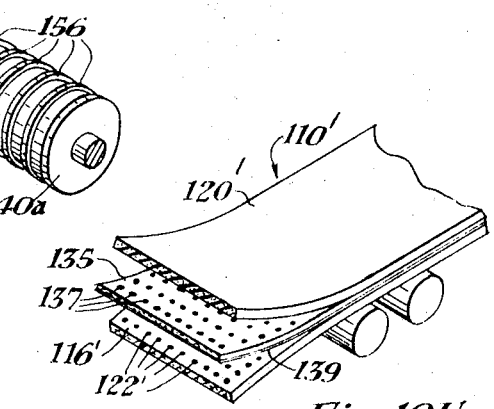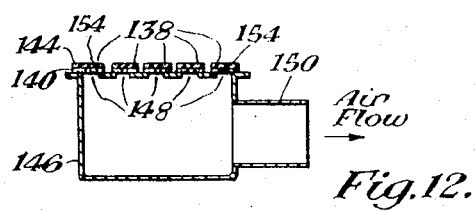

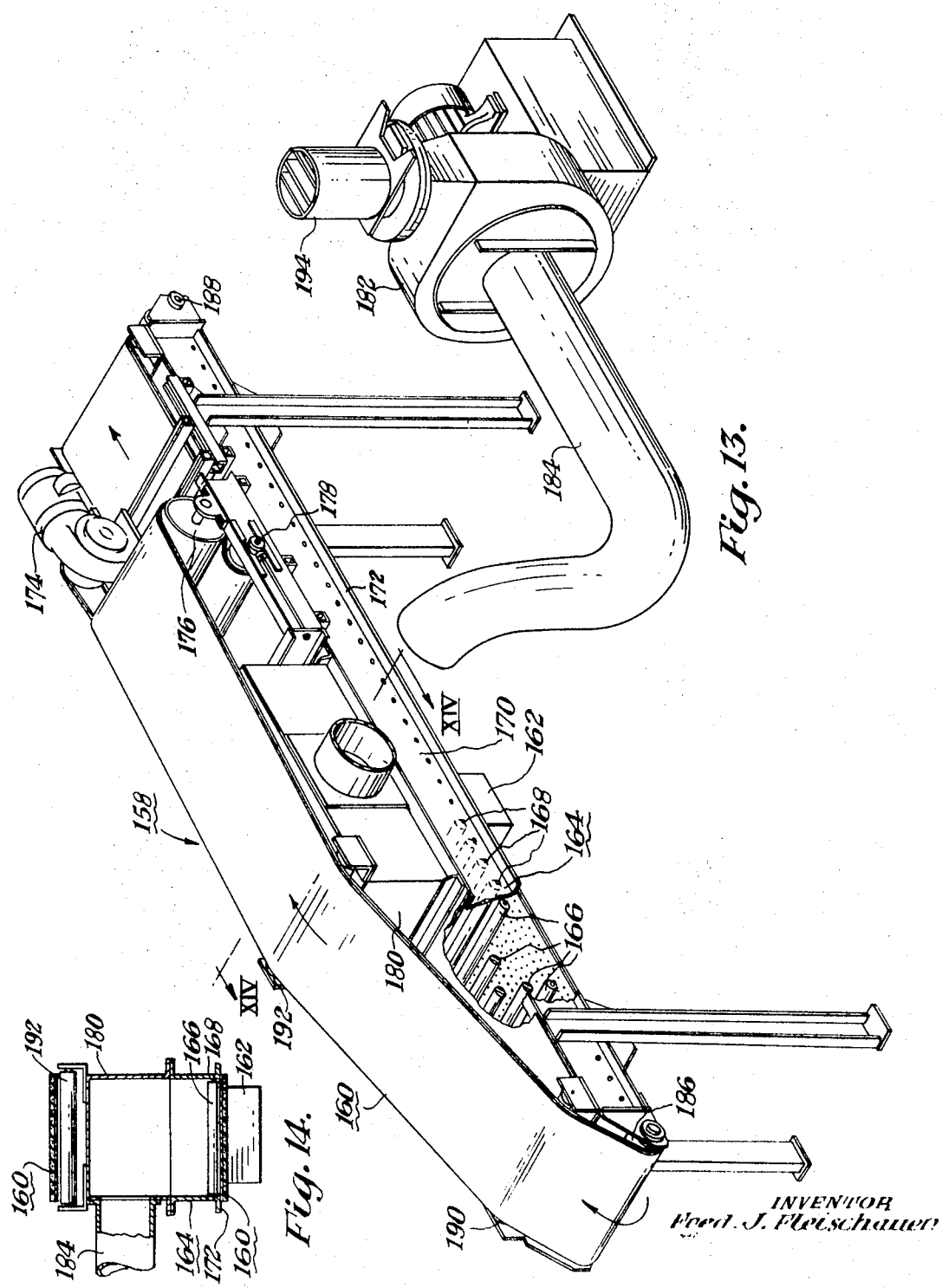

INVENTOR
Fred J. Fleischauer

INVENTOR
Fred J. Fleischauer

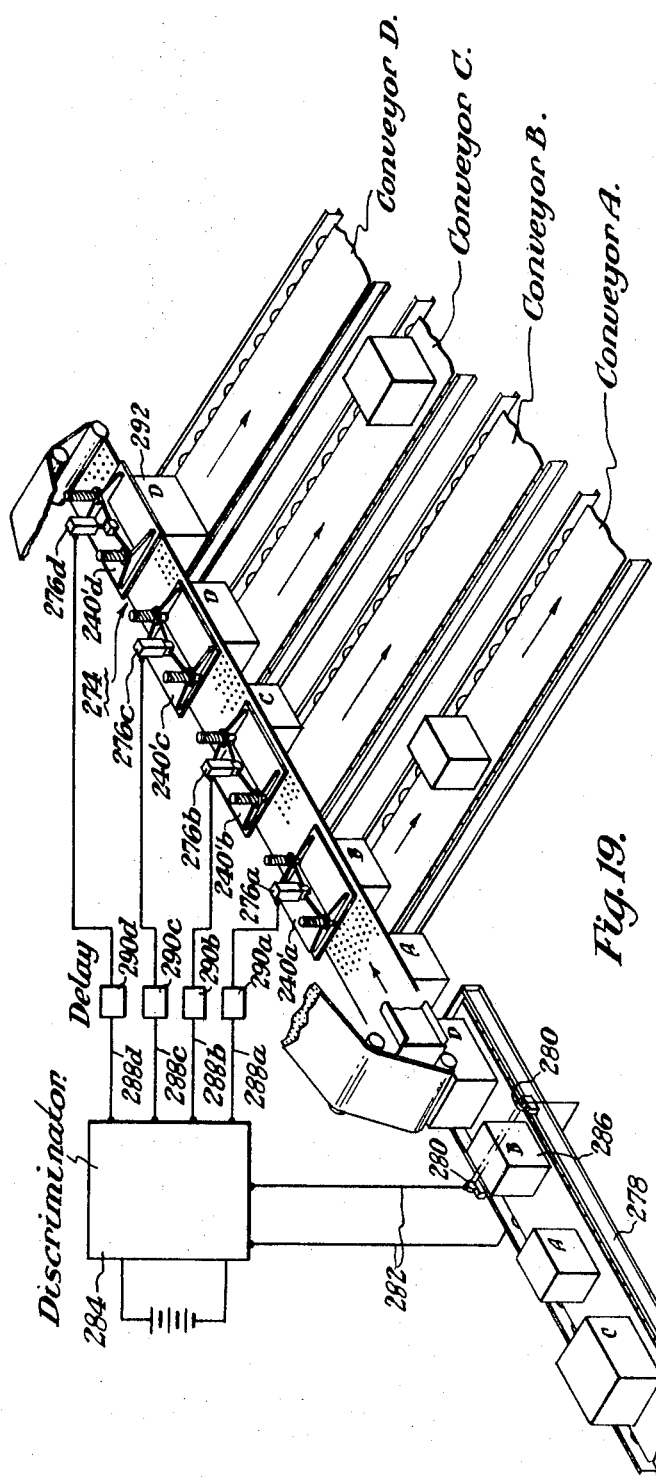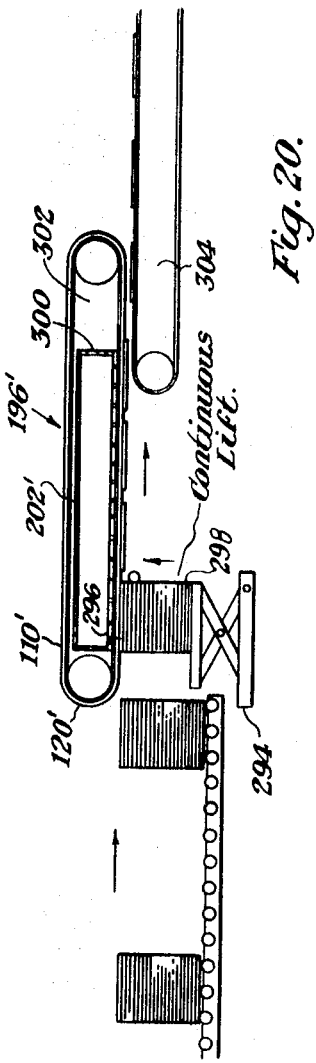

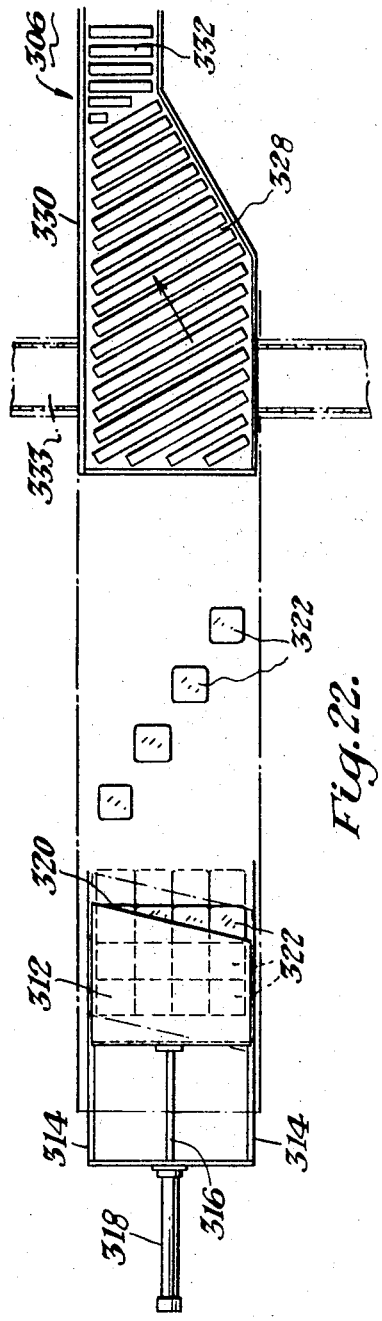
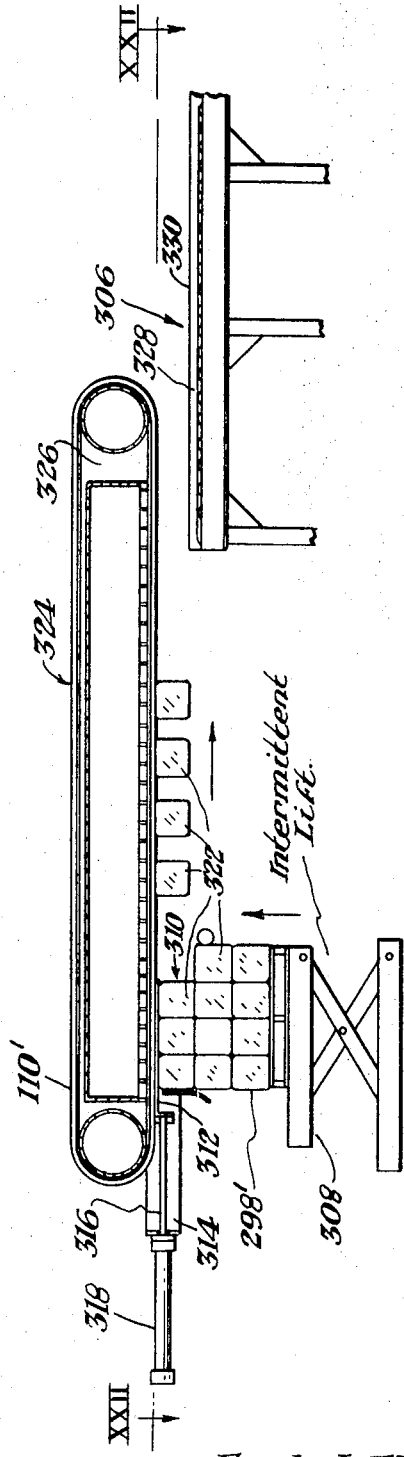
Fig.22.
Fig.21.

INVENTOR.
Fred J. Fleischauer

INVENTOR
Fred J. Fleischauer.

DIFFERENTIAL PRESSURE CONVEYORS

This application is a division of my copending application entitled Air Lift and Vacuum Conveyors and Foraminous Belt Means Therefor, filed May 29, 1967, Ser. No. 651,082, now U.S. Pat. No. 3,477,558, which in turn is a continuation-in-part of my then copending application entitled Air Lift and Vacuum Conveyors, filed Oct. 27, 1966, Ser. No. 589,945, now abandoned.

The present invention relates to conveyor means and more particularly to an air lift and vacuum conveyor to which items to be conveyed are supported by pressure differentials across a foraminous portion of the conveyor, i.e., by partially supporting on an air cushion as in accumulator and/or alignment conveyors or by suction for various load-suspending operations, for example, general conveying, elevated or overhead conveying, elevating, diverting, unscrambling, stacking and unstacking operations and the like, which are more readily carried out by suspending the articles to be conveyed from the underside of the conveyor or, as in elevating operations, where the articles must be retained against a moving belt or other conveyor means supported vertically or steeply sloped. The invention is particularly useful in handling fragile items such as glass sheets and the like.

Various vacuum lifting devices, involving suction heads or chambers employing one or more vacuum cups have long been available in the art. Such equipment is usually arranged for making relatively airtight seals with the articles to be conveyed or lifted and because of size limitations, relatively high vacua or large pressure differentials are required. The seals involved must be as nearly airtight as feasible in order to reduce pumping expenditures, the first cost of which is relatively high due to the relatively high vacua required. Because of the character of the associated arrangements, additional equipment is required for reversing the air pressures in the vacuum or suction cups to release the same at the destination of loads carried thereby. Notwithstanding, such mechanisms find use in handling flat sheets of glass, plywood, and other more or less fragile items. The physical characteristics of some products to be lifted and of the vacuum elements themselves, on the other hand, prevent the use of known vacuum lifting arrangements for many applications because of their application of concentrated forces to separated areas of the fragile articles.

Known vacuum cups and chambers normally depend for their lifting ability upon the maintenance of a relatively large pressure differential acting upon a relatively small area of the load. Large bending forces therefore can be created which can deform or even break certain products or materials, for example, glass or other brittle sheet material, with the result that the applications of known vacuum lifting devices are limited in this respect also. Remedial steps in the form of lowering the pressure differential and employing large vacuum cups or many closely spaced cups are uneconomical or impractical in most cases.

Leakage rates present another major problem to be solved in high-vacuum lifting applications, as the presence of a large pressure differential promotes the flow of correspondingly larger volumes of air at points of leakage into the device. For example, where a given load consists of many individual units such as a layer of cartons on a pallet, difficulty is usually encountered in arranging the vacuum devices so that voids at carton edges will not be spanned to form inevitable points of leakage. Such difficulties are aggravated where the vacuum lifting device must be adapted to various carton layouts or generally to loads of differing configurations.

In general, where complete sealing cannot be effected for the foregoing reasons, it is necessary to pump large volumes of air continuously in order to maintain the vacuum cups or lifting chambers at the required pressure differentials. Thus, the equipment required to maintain a relatively high vacuum under the aforementioned leakage conditions by constant pumping can be extremely expensive and costly to operate. Although high-vacuum lifting techniques would otherwise be useful in handling many industrial products and materials, their general application has been limited.

In view of the limited applicability of high-vacuum lifting techniques, various low-vacuum lifting devices have been devised and have found limited uses in industry. For purposes of definitive terminology the term "high vacuum" denotes pressure differentials in the range of about 2½ to 12½ p.s.i. while the term "low vacuum" usually denotes pressure differences of up to about 2½ p.s.i. It is to be understood, however, that the usage of the aforementioned terms are not rigorously categorized and thus, generally speaking, there is a certain overlappage in the applied ranges of pressure differentials.

In typical low-vacuum devices, suction is developed by connecting the inlet port of the centrifugal blower or the like to a vacuum chamber. The blower desirably has a low-pressure, high-volumetric characteristic. Its curve of pressure differential versus volume is relatively flat and at its zero delivery point the blower produces a vacuum that remains near its maximum specifications.

These low-pressure suction devices have been adapted primarily for use in palletizing and depalletizing lifting and transferring machinery. In order to have the same lifting capacity as a high-vacuum device the low-vacuum unit must act upon a correspondingly greater area of the load. The resulting large suction area of the vacuum chamber has given rise, therefore, to serious sealing problems. In the case of the moving belt, low-vacuum conveyor, the aforementioned sealing problems are greatly aggravated because of the relatively moving conveyor components in the area in which sealing is required. Moreover, the belt was usually slid over an apertured support forming part of the vacuum chamber and power requirements became excessive.

For the most part, prior vacuum conveyors had to be almost completely if not entirely covered with large articles or with a closely spaced array of articles to minimize leakage between and around the articles in order to preserve the necessary vacuum.

Known accumulator conveyors have live rollers or other complicated devices arranged to permit the moving parts of the conveyor to move beneath an accumulation of articles on the conveyor. In many applications the use of a flexible conveyor belt or the like is precluded because the accumulated weight of the articles caused undue belt wear or required excessive power because of increasing friction to move the belt beneath the articles. Finally, a problem common to all belt conveyors is the difficulty of tracking the belt properly relative to the driving means therefor.

The novel air lift or vacuum conveyor disclosed herein overcomes the difficulties of the prior art by providing an elongated air or vacuum chamber, a flexible foraminous belt (illustrated in one arrangement of the invention as a "slat" or "pallet" type conveyor) moving thereover and closing at least one side of the vacuum chamber, and means for sealing the junction between the flexible belt and the vacuum chamber. The sealing means of the novel conveyor arrangement are further arranged to permit limited movement of the flexible belt toward and away from the juxtaposed edges of the vacuum chamber in order to accommodate inevitable sag in the belt resulting from normal wear or from manufacturing tolerances and imposition of relatively heavy articles adhered to the underside of the conveyor, as when the conveyor is employed in a horizontal, overhead position.

It is contemplated that either positive or negative pressure differences can be maintained across the belt of the disclosed conveyor for either air lift or vacuum operations. When employed as an air lift conveyor, the articles thereon are partially "floated" on a cushion of air escaping through the belt so that greater part of their weight is born thereby. Accordingly, sliding friction between the articles and belt is considerably reduced so that the belt can continue to run, when the articles are accumulated, without causing undue belt wear or requiring excessive driving power.

The foraminous belt is provided with sufficient flexibility so that it will flex about the adhered surfaces of the article carried by the conveyor and thus prevent substantial vacuum losses when nonplanar articles are carried by the conveyor. The suction areas of the conveyor belt are arranged such that limited leakage, in accord with the invention, occurs through those areas of the conveyor belt which are not covered by conveyed articles. In accordance with another modification of the disclosed vacuum conveyor, additional foraminous means can be associated with the flexible belt which will cause suction to be applied coextensively to the entire juxtaposed surface of the articles adhered to the conveyor rather than merely to those portions of the juxtaposed surface which are immediately adjacent the vacuum openings of the conveyor. In one arrangement of my invention the additional foraminous means is a layer of compressible, open cell material covering the conveyor belt. Thus, when articles are adhered to the conveyor the shear stresses developed at the edges of the adhered surfaces of the articles compress the open cell material tend to seal off the material and minimize leakage from the conveyor. Moreover, the compressibility of the open cell material permits articles with nonplanar surfaces to be adhered to the conveyor.

In accord with still another modification of the vacuum conveyor, means are associated with the vacuum chamber thereof for applying suction to the conveyor belt return portions, i.e., where the belt is passed over the drive and idler pulleys therefor. In other applications the chamber is partitioned or otherwise divided into compartments along part or all of its length for selective loading or unloading of articles. In furtherance of this purpose differing pressure differentials can be applied to the compartments respectively to load or unload articles according to differing weights or sizes of adhered surfaces thereof for sorting purposes. In the latter arrangement, remotely or manually controlled valve means can be coupled to an inlet or in a bleed line or both to each compartment to control the pressure differential therein for either adhering or releasing an article at a given chamber compartment.

In still other arrangements of the conveyor, means are provided at either or both ends of the conveyor for intermittently equalizing the pressure differentials of the chamber in these areas for loading and unloading purposes. In one arrangement of the loading and unloading means, the aforementioned belt return portions are included therein, and conduit means are provided for selectively applying or equalizing pressure differentials in one or both of these areas for purposes of loading articles onto the conveyor at one end thereof and for releasing articles therefrom at the other end. Still another feature of the vacuum conveyor is a driving arrangement for the conveyor belt which cooperates therewith in an unique manner when provided with the evacuatable return portions. Unique means are also associated with the conveyor belt to cause the belt to track properly on its driving means.

In other arrangements of my conveyor means, the conveyor is provided with means for increasing the differential pressure across the foraminous belt in either the air float or vacuum conveyor applications. Such means also lessens the volumetric requirement of the blower or compressor associated with the conveyor. As the foraminous belt performs a filtering action upon the air circulated therethrough, novel means can be associated with the air lift or vacuum conveyors disclosed herein for either intermittently or continuously cleansing the foraminous belt.

Novel means are provided in association with my novel conveyor means for automatically unscrambling, aligning, and/or sorting articles conveyed thereon and for diverting such articles when desired onto one or more conventional cross conveyors or onto a palletizing structure. A novel depalletizing structure or unstacker is provided which is capable of a continuous lift without requirement for indexing owing to a lifting characteristic of my novel conveyor which raises the uppermost article of a stack of articles supported on the unstacker so as to clear the next lower article so that the adhered article can be moved horizontally without marring or scratching of the surfaces. In this connection another novel feature of my invention is the use of porous or foraminous paper or other material interleaved with the stack of articles through which the differential pressures developed by my vacuum conveyor art upon the surfaces of the articles. Thus, the protective paper or the like can be moved with each article during depalletizing, palletizing and other conveying operations.

Another novel arrangement of my conveyor means, when used as an air lift conveyor, consists in tilting the conveyor toward one of its lateral sides so that elongated articles deposited at random upon the conveyor are floated toward an alignment rail or the like supported adjacent such lateral side to align the articles in accord with their long dimensions. An analogous situation attains in an opposite sense when my conveyor means is utilized as a vacuum conveyor. In this case articles deposited upon the vacuum conveyor in a predetermined array (on either the lower or upper run of the conveyor) are adhered rigidly to prescribed positions on the conveyor while external, usually automated, operations such as grinding, milling, polishing, marking, and the like are performed on the articles without concern for inadvertent displacement of the articles from their prescribed positions.

In still other arrangements of my novel vacuum conveyor the foraminous belt is shaped in conformance with or to facilitate conformance to articles of irregular shapes or with articles having regular but nonplanar shapes. It is also contemplated that a vacuum chamber associated with my novel vacuum conveyor can be provided with a valving arrangement to reduce or eliminate leakage through those areas of the belt which are not covered by articles being conveyed.

I accomplish these desirable objects, in accord with one form of my invention, by providing a conveyor arrangement comprising an elongated chamber structure having a flow means along at least one side, an endless foraminous conveyor belt means having a run thereof supported generally against said open side, said belt means having a relatively large number of flow impeding openings therethrough communicating with said open side, means for moving said conveyor belt relative to said chamber structure, and means for establishing a pressure differential within said chamber.

The belt means can be formed of interconnected, perforated slats each of which may be covered with an open-celled foam material, or alternatively I provide an endless foraminous belt for an air conveyor said belt comprising said conveyor belt formed from an endless flexible member having a number of flow apertures extending therethrough, and a layer of open-celled foam material secured to said flexible member and coextending therewith, the open cells of said foam material being in communication with said flow apertures.

I also provide a vacuum conveyor where pressure equalizing means of one of various forms are mounted adjacent an end of said chamber structure and are juxtaposed to a release area of said belt means, which pressure equalizing means may be actuated by a limit switch mounted adjacent said belt release area for operation by a conveyed article.

In other applications of my novel conveyor said chamber structure is closed at both ends and a perforated return roller for said belt is rotatably mounted adjacent one of said chamber ends for establishing a pressure differential through said belt at the associated belt return, and conduit means are coupled to said perforated roller and to said pressure differential means.

During the foregoing discussion various objects, features and advantages of the invention have been alluded to. These and other objects, features and advantages of the invention will be elaborated upon during the forthcoming description of certain presently preferred embodiments of my invention together with certain presently preferred methods of practicing the same.

In the accompanying drawings there are shown presently preferred embodiments of my invention together with preferred methods of practicing the same wherein:

FIG. 1 is a top and right side isometric view of an exemplary form of the vacuum conveyor of the invention with parts broken away and other parts removed in order to show the invention more clearly;

FIG. 2 is a cross-sectional view of the vacuum conveyor shown in FIG. 1 and taken along reference line II–II thereof;

FIG. 3 is a partial cross-sectional view, similar to FIG. 2 and illustrating another form of sealing means which can be utilized with the vacuum conveyor;

FIG. 4 is a horizontal, longitudinally sectioned view of the vacuum conveyor shown in FIG. 1 and taken along reference line IV–IV thereof;

FIG. 5 is a partial, slightly enlarged, side elevational view of the conveyor shown in FIG. 1;

FIG. 9 is an isometric view partially broken away of another form of my novel foraminous belt for controlling pressure differentials of either a vacuum or air float conveyor;

FIG. 10 is an enlarged, partial, cross-sectional view of one of the belt runs in FIG. 9 and taken along reference line X–X thereof;

FIG. 10A is a similar view showing a modified form of the belt shown in FIGS. 9 and 10 and adapted for a particular shape of nonplanar articles;

FIG. 10B is a partial, top plan view of still another form of my foraminous belt adapted for nonplanar articles;

FIG. 10C is a similar view of yet another form of my belt with a modified foam layer;

FIG. 10D is a similar view of another belt modification;

FIG. 10E is a partial isometric view of still another belt modification;

FIG. 11 is a schematic, partially broken away, isometric view of still another novel form of my conveyor means having modified belt and chamber structures;

FIG. 12 is a cross-sectional view of the apparatus shown in FIG. 11 and taken along reference line XII–XII thereof;

FIG. 13 is an isometric view partially broken away of another form of vacuum conveyor arranged in accordance with my invention;

FIG. 14 is a cross-sectional view of the apparatus as shown in FIG. 13 and taken along reference line XIV–XIV thereof;

FIG. 19 is an isometric and schematic view, with parts removed or broken away, of a vacuum conveyor and diverting conveyor arrangement with circuit means for automatically sorting articles supplied to the vacuum conveyor;

FIG. 20 is a longitudinally sectioned view of a novel depalletizing arrangement in accordance with my invention;

FIG. 21 is a longitudinally sectioned view of a novel unstacking, unscrambling and aligning conveyor arrangement in accordance with my invention;

FIG. 22 is a partial top plan view of a portion of the apparatus shown in FIG. 21 and taken along reference line XXII–XXII thereof;

Figure 28:
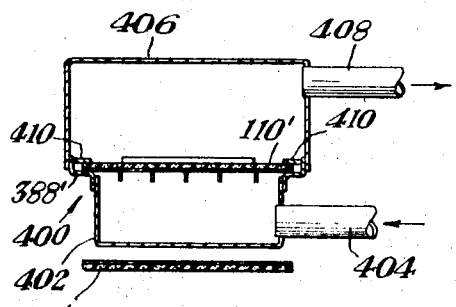
Figure 29:
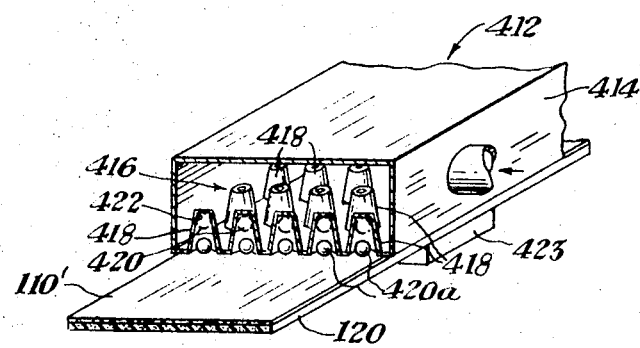

FIG. 28 is a similar view of a novel air lift conveyor having similar differential pressure increasing and load reducing means; and FIG. 29 is a longitudinally sectioned view of still another form of vacuum conveyor having valve means associated with the open or flow side of its vacuum chamber to prevent the application of differential pressures to those belt areas which are not covered by articles being conveyed.

Although the several novel features of my invention are shown in most cases in association with a given one of the chambers and/or belt structures disclosed herein, it is to be understood that where practical, other chamber and/or belt forms can be associated therewith. For example, the belt release means of FIGS. 18A–18D can be associated with the slat- or pallet-type conveyor belt of FIGS. 1–8, or with a chamber structure having an entirely open side (FIG. 1), a largely open supporting grid structure (FIGS. 15 and 16), a roller support bed (FIG. 13), or other flow permitting means.

It will be understood that, while the positive and negative pressure differentials are described herein as resulting from airflows, these pressure differentials can be established by flows of other gases or by liquid flows.

Referring now more particularly to FIGS. 1, 2, 4 and 5 of the drawings, the illustrative form of the air lift or vacuum conveyor 10 shown therein includes an elongated air or vacuum chamber structure 12 having, as viewed in FIG. 1, vertical sidewalls 14 and end walls 16.

As better shown in FIG. 2 the top and bottom 18 and 20 of the vacuum chamber 12 are completely open but are covered by a semiflexible foraminous belt denoted generally by reference character 22 and described more fully hereinafter. In those applications where only one side, for example the bottom, of the conveyor 10 is to be used for transferring articles, the other side, for example the top side, of the vacuum chamber 12 can be closed by a flat, impervious panel, as indicated by chain outline 24 in FIG. 2, in order to eliminate leakage through the adjacent side of the belt and thereby to reduce pump load.

A pressure differential is maintained between the vacuum chamber 12 and the ambient through a suction conduit 26 coupled thereto through sidewall 14 for example and connected to the intake port of a relatively low-pressure high-volume vacuum producer such as a centrifugal blower 28. The blower 28 is sized such that a vacuum head or pressure differential of about 1½ pounds per square inch is maintained within the vacuum chamber 12. It is to be understood, however, that the exact pressure and volume requirements of the pump or blower will depend upon the weight and exterior contour of the articles to be lifted and transferred thereby, and upon the extent of the uncovered belt area.

It is also contemplated that a positive pressure differential can be established within the air chamber 12 and that the bottom thereof can be closed, as by a panel such as the panel 24, so that the top run of the belt is available for accumulator purposes. The direction of the blower 28 is then reversed and the pressure and volume characteristics thereof are adjusted to establish an air "cushion" or lift which is capable of bearing part or nearly all of the weight of the articles. This air lift greatly reduces the frictional forces between the articles and belt, and permits the belt to pass under the articles and belt, and permits the belt to pass under the articles without undue wear or power expenditure.

An article 30 (FIG. 1) carried by the conveyor will be removed therefrom as the conveyor belt 22 attempts to carry the article around the return belt portion designated at 22a, at which time loss of suction occurs inasmuch as the return portion 22a and the belt return at the other end of the conveyor are not coupled to the vacuum chamber 12, owing to the impervious end walls 16 thereof. In other applications alternative conveyor-unloading means can be provided. As shown in FIG. 1 the alternative unloading end of the vacuum conveyor 10 can be demarcated by an end compartment 32 of the vacuum chamber, with an impervious partition 34 being provided for this purpose and extending between the sidewalls 14 of the chamber in one direction, and between the conveyor belt runs in the other direction. The compartment 32 normally is evacuated with the balance of the vacuum chamber 12 by means of a branched suction conduit 36 coupled to the compartment 32 at one end to the vacuum chamber suction conduit 26 at the other end, with the result that air is withdrawn both from the compartment 32 and the balance of the vacuum chamber 12 by operation of the blower 28.

A normally open solenoid valve 38 or the like is coupled in the conduit 36 and is connected through suitable circuit means denoted by chain outline 40 to limit switch 42. The limit switch 42 is positioned adjacent the unloading end of the conveyor 10 such that actuator arm 44 thereof is engaged by the article 30 at the desired unloading position of the latter to actuate the limit switch 42 which in turn energizes the solenoid valve 38 to its conduit closing position. This operation terminates the withdrawal of air from the vacuum chamber compartment 32, and usually the normal leakage of the air into the compartment 32 equalizes the low-vacuum pressure differential very quickly to release the article 30 at the desired unloading position thereof.

However, in those applications where release in this manner is not effected quickly, for example as where the vacuum chamber 12 is provided alternatively with a top impervious panel 24, and the article 30 covers substantially all of the open bottom of the unloading compartment 32, additional pressure-relieving means can be provided and energized for example by the limit switch 42. An example of such means includes pressure-relieving conduit 46 coupled to the sidewall 14 of the vacuum chamber 12 and located adjacent the compartment 32 to communicate therewith. A normally closed solenoid valve 48 is coupled in the pressure-relieving conduit 46 which opens to the ambient, and is likewise connected through suitable circuitry 50—40 to the limit switch 42 for energization thereby simultaneously with the solenoid valve 38. Thus, actuation of the switch 42 by the article 30, in the latter example, closes the normally open solenoid valve 38 to terminate withdrawal of air from the compartment 32 by blower 28 and at the same time opens the normally closed solenoid valve 48 to equalize the negative pressure differential therein.

In other applications of my invention, one or more additional partitions, for example the partition 34a (FIG. 1) can be provided along the length of the chamber 18 to defined additional loading or unloading zones or compartments, for example the zones 33 and 35. Valves 39 in conduits 26, 26a, and 36 can be adjusted to provide differing pressure differentials in compartments 32, 33 and 35 if desired, for automatically sorting or selective unloading of articles according to weight or to relative areas of engagement with the belt 22, or both. Alternatively, compartments 33 or 35 or both can be unloaded by operation of solenoid valves 38 disposed in their conduits 26 and 26a and controlled by load-actuated switches (not shown) similar to the actuator 42—44. In the latter arrangement the load-actuated switches can be variously positioned so as to be engaged by loads of respectively varying sizes or positions on the conveyor belt 22. In any event, where a plurality of unloading chambers or stations are provided, the articles respectively unloaded thereat can be sorted into appropriately positioned receptacles, including additional conveyors, as desired. It is also contemplated that one or more switches 42—44 for one or more of the compartments 32, 33 and 35 can be operated manually for sorting or other unloading purposes.

As noted previously, a semiflexible and foraminous conveyor belt 22, in this example, is supported so as to cover the open top and/or bottom of the vacuum chamber 12 and is fabricated from a relatively large number of relatively narrow slats 52 extending transversely both of the conveyor belt 22 and of its direction of movement denoted by arrow 54. In this arrangement each of the slats 52 is secured adjacent its ends respectively to a pair of spaced drive chains 56 or the like coextending with the endless conveyor belt 22. The use of slats 52 permits the belt to flex longitudinally to some extent about uneven or nonplanar loads. The slats themselves can be made from a variety of materials, which are suitably perforated, such as steel wood, or pegboard. If the latter be used, the roughened side thereof aids in spreading the differential pressures beyond the edges of the apertures. Alternatively, a rigid open-celled material such as polyurethane foam can be employed. It is also contemplated that the chamber 12 can be omitted and each of the slats 52 made thicker but hollow with an outer perforated side. Then, individual ducts can be coupled thereto from a suitable rotatable manifold (not shown).

The drive chains 56 are sufficiently flexible to pass unrestrictedly around the belt returns 22a and 22b and adjacent a pair of belt pulleys rotatably mounted on each end of the vacuum chamber 12. In one arrangement of the invention the belt pulleys 58 are of hexagonal configuration for complementary engagement with the three slats 52a or 52b at the belt return portions 22a and 22b respectively. Of course depending upon the height of the vacuum chamber 12 as viewed in FIG. 1 of the drawings, which will determine the number of slats 52a or 52b at the belt return, pulleys 58 of a different polygonal contour can be employed. For positive engagement with the conveyor belt chain 56 or the like, the pulleys 58 can be provided with suitably spaced sprocket teeth (not shown) and the chains can be passed thereover. Alternatively the pulleys 58 can be provided in the form of circular sprockets (not shown) for engagement with the chains 56, with the slats being mounted thereon. On the other hand, the chains 56 can be displaced outwardly of the hexagonal pulleys 58, and the conveyor belt 22 can be driven by engagement of the pulleys' corners with the complementary disposed junctions between the angled slats at the return portions of the conveyor belt, as better shown in FIGS. 1 and 4. In the latter arrangement the lateral juxtaposition of the chain 56 at the outer edges of the pulleys 58 provides a proper tracking of the conveyor belt 22 relative to the drive pulleys. Belt tracking is also assured by the seals 66 (FIG. 2) or 70—72 (FIG. 3).

For supplying rotative power through the pulleys 58 to move the belt 22, a pair of the pulleys at either end of the vacuum chamber 12 can be secured to their supporting shaft 60 for rotation therewith, and the latter rotatably mounted on the adjacent end of the vacuum chamber 12 for rotation at the required speed by a suitable drive mechanism, for example the motor and gear reduction unit described below in connection with FIG. 7 of the drawings.

In order to apply suctional forces to one or more articles 30 supported by the vacuum conveyor 10 each of the conveyor belt slats 52 is provided with a relatively large number of apertures 62 in the intermediate portions thereof extending between the vertical sidewalls 14 of the vacuum chamber 12. The apertures 62 in this example are relatively small in diameter and are spaced on 1-inch centers in either a straight or a staggered pattern. In one application of the invention the diametric dimension of each aperture 62 is about three-sixteenths inch in order to minimize the volume of air which must be withdrawn from the vacuum chamber 12 by the blower 28 in order to maintain the aforesaid negative pressure differential therein. It will be understood that a wide range of perforate patterns and hole sizes can be used depending on the specific application of the invention.

Leakage from the vacuum chamber 12 is further minimized by the provision of suitable gasketing material secured along the juxtaposed edges of adjacent belt slats 52. Such material can be an elongated strip of closed-cell sponge material 64 secured as by gluing or the like to one or both of each pair of adjacent lateral edges between the slats 52. Desirably, the gaskets 64 coextend with the length of slats 52 and are of appreciable width not only to fill the gaps between adjacent slats but also to be compressed thereby in order to maintain an effective seal. The gaskets 64 can be fabricated from strips of foam rubber or other resilient plastic sponge material to permit further compression and expansion thereof and to permit angular disposition of the slats at the conveyor belt returns, as denoted by reference character 64a. Alternatively the gasket 64 can be omitted and the slats 52 can be arranged with their lateral edges very nearly engaged as permitted by manufacturing tolerances and the necessary flexures of the chain 56 at the belt returns. In the latter case, overlapping ribs additionally can be secured along the lengths of adjacent lateral slat edges.

In order to further reduce pumping requirements, sealing means desirably are provided for preventing the entrance of air between the upper and lower edges of the vacuum chamber 12 and the juxtaposed portions of the conveyor belt 22. As better shown in FIGS. 2 and 5 one arrangement of said sealing means includes a plurality of sealing members 66 secured individually to the inward surfaces of the slats 52 adjacent the ends thereof. The sealing members 66 desirably are fabricated from a flexible material such as relatively soft rubber or other suitable plastic material in order to permit displacement whereof resulting from flexure of the belt slats at the belt return portions, as better shown in FIG. 1. The sealing members 66 desirably are extended a sufficient distance toward the central axis of each chamber sidewall 14 in order to maintain sealing engagement therewith under the usual sag conditions in the lower conveyor belt run, or where the belt 22 tends to flex about nonplanar load adhered thereto. The sealing members 66 can be a planar section of one of the aforementioned materials having sufficient thickness to maintain its shape but sufficiently compressibility to permit deformation of their rounded corners as they bend about the belt returns. As better shown in FIG. 2 the sealing members can be provided with a plurality of parallel ridges on the side thereof juxtaposed to the vacuum chamber sidewall 14 to form a limited leakage or labyrinthine-type seal therewith, as denoted by reference character 66.

Alternatively as shown in FIG. 3 of the drawings the sealing member 66 can be replaced by a relatively rigid backing plate 70 having a strip of sponge gasket material 72 on the inward surface of the plate for lightly engaging contact with the chamber sidewalls 14 as the belt slats are moved therealong. Preferably, in the arrangement shown, the backing plate 70 terminates short of the lateral edges of the associated slats 52 to permit angular disposition of the slats 52 at the belt returns without bearing engagement of adjacent backing plates 70 thereat. In the arrangement as shown in FIGS. 1 and 2, the sealing means 66 or 70 are arranged to pass between the pulleys 58 and the adjacent ends of the vacuum chamber sidewalls 14 as better shown in FIG. 2 of the drawings. The pulleys 58 at each end of the vacuum chamber 12 are spaced outwardly thereof for this purpose.

Figure 6:
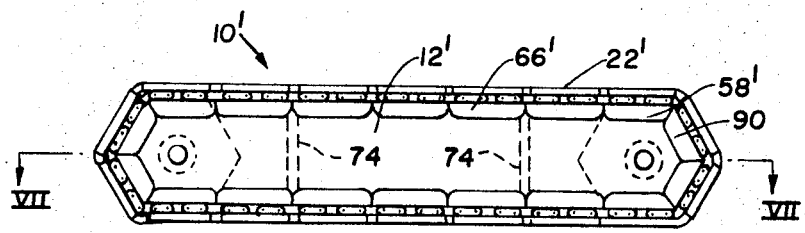
FIG. 6 is a side elevational view of another form of vacuum conveyor arranged in accordance with the invention.
Figure 7:
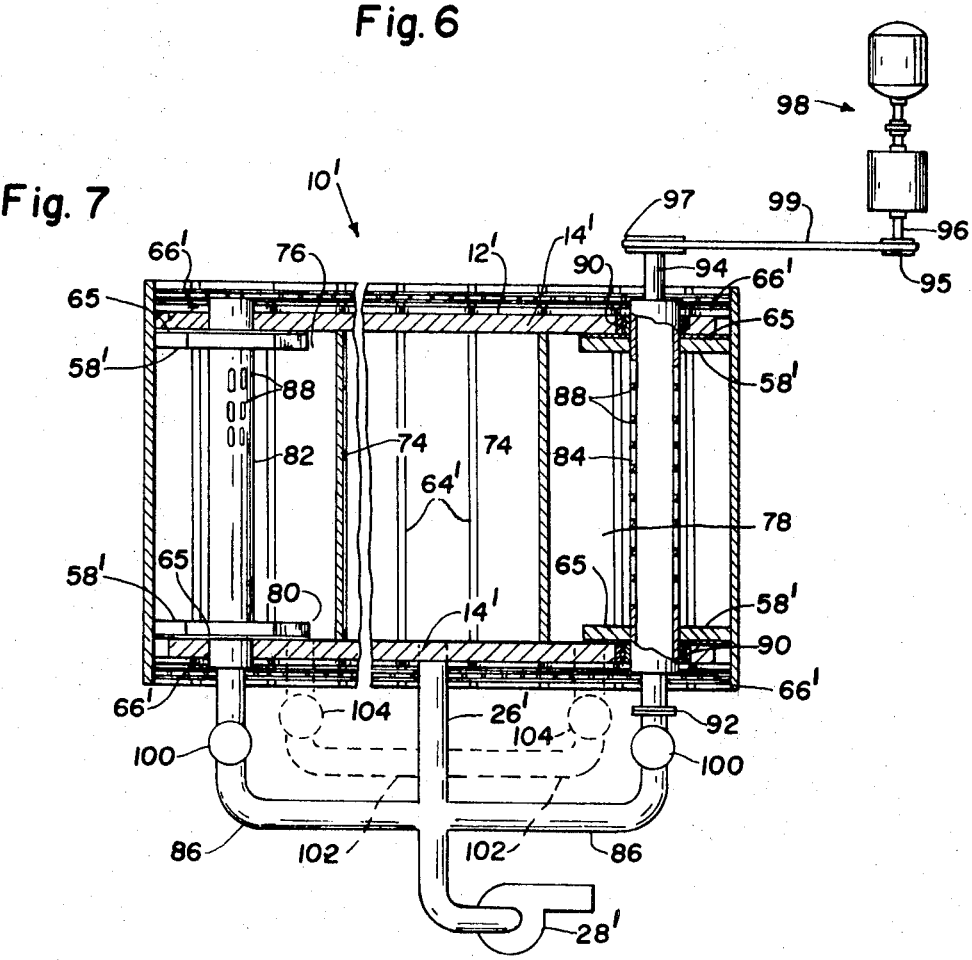
FIG. 7 is a horizontal, longitudinally sectioned view of the vacuum conveyor shown in FIG. 6 and taken along reference line VII–VII thereof.

Referring now to FIGS. 6 and 7 of the drawings, another modification of the vacuum conveyor is illustrated therein and arranged in accordance with the invention.

In the latter modification of the invention similar components relative to FIGS. 1 to 5 of the drawings. In the arrangement of FIGS. 6 and 7 a vacuum conveyor 10' is provided with a vacuum chamber 12' having sidewalls 14'. The vacuum chamber 12' however is open at both ends as well as the top and bottom, and the sidewalls 14' thereof can be secured in suitably spaced relation by a number of tire rods (not shown). Alternatively the sidewalls can be spaced by partition members 74 which define respectively loading and unloading vacuum compartments 76 and 78 adjacent the ends respectively of the conveyor 10'. Where the conveyor 10' is utilized in the horizontal position or where suction is otherwise required on only one side thereof, either the open top or the open bottom of the vacuum chamber 12' can be closed by means of the panel 24 illustrated in FIG. 2 of the drawings.

In the arrangement shown in FIGS. 6 and 7 means are provided for applying suction or a negative pressure differential to the belt return portions at each end of the conveyor in the event that it is desired to convey articles part or all of the way around the belt return portions. Such application is useful where it is desired to change the direction of movement of articles carried by the vacuum conveyor for stacking purposes or for loading onto a transversely moving conveyor or on other conveyance means. In other applications it may be necessary to bend the conveyor belt 22' from a horizontal one to a vertical or inclined run and suction must be applied to the belt where it passes over pulleys such as 58' to make the necessary bend.

As better shown in FIG. 7 of the drawings the conveyor belt pulleys 58' are rotatably mounted at each end of the vacuum chamber 12' and are closely fitted against the adjacent portions of the inner sidewall surfaces as denoted by reference characters 80. In one arrangement of the invention each pair of pulleys 58' is mounted upon a perforated tubular shaft 82 or 84 coupled in communication with auxiliary or branched suction conduits 86 which in turn are coupled to the chamber suction conduit 26' and blower 28'. The perforated shafts 82 and 84 desirably are provided with relatively large openings or slots 88 through which suction air can pass with little or no resistance. At one end of the conveyor 10' for example the lower end, as viewed in FIG. 7 of the drawings, the belt pulleys 58' are rotatably mounted upon the stationarily supported, perforated shaft 82, while at the upper end of the conveyor 10', the belt pulleys 58' are secured to the tubular shaft 84 for rotation therewith. The latter shaft 84 is rotatably mounted upon the adjacent ends of the vacuum chamber sidewalls 14' in suitable bearings 90. A rotatable seal 92 is provided between the junction of the tubular shaft 84 and the auxiliary suction conduit 86 to facilitate the required relative movement therebetween without loss of vacuum. The sealing means denoted generally at 66' are depended from each end of each conveyor slat 52' and disposed to engage the adjacent outer surfaces of the sidewalls 14' in the manner described in connection with FIGS. 2 and 5 or FIG. 3 of the drawings. As illustrated, the sealing means 66' do not engage the pulleys 58' although a pressure differential exists thereacross, inasmuch as the pulleys engage the inner surfaces of chamber walls 14'. An adequate seal between the pulleys 58' and the walls 14' is established by means of gaskets 65. Adequate sealing between the pulleys and slats is attained by the slats 52' being closely fitted about the pulleys 58', the engaging surfaces of which can be machined, if desired, for this purpose.

At the other end of the rotatable tubular shaft 84 a stub shaft 94 is secured concentrically therewith and is coupled through a suitable mechanical linkage, such as pulleys 95, 97 and belt 99, to the output shaft 96 of a speed reducer and motor drive denoted generally by the reference character 98, to impart relatively slow rotational movement to the pulleys 58' secured to shaft 84 to drive the conveyor belt 22 at the desired speed.

With the arrangement shown the loading and unloading conveyor compartments 76 and 78 are evacuated through the tubular shafts 82 and 84 respectively by the blower 28'. A normally open solenoid valve 100 or the like is coupled in each of the conduit branches 86 and is controlled by the suitably disposed limit switches or other remote control means (not shown) to actuate one or both of the valves 100 during the loading or unloading operation at either end of the conveyor 10'.

It is to be understood of course that one or both of the vacuum chambers partitions 74 can be eliminated if the suction compartment 76 or 78 or both are not required. It is also contemplated that the tubular perforated shafts 82 84 can be replaced by conventional shafts and suction air can be withdrawn from the compartments 76 and 78 by associated valved conduits denoted by the chain outlines 102 and 104, in which case the conduits 86 can be eliminated.

Figure 8:
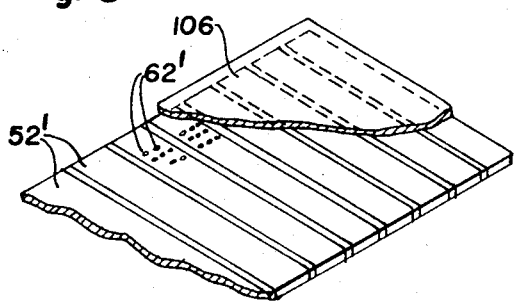
FIG. 8 is a fragmentary isometric view of the upper run of a vacuum conveyor arranged generally in accordance with FIG. 1 and illustrating the use of means for increasing the suctional area of the conveyor.

Referring now to FIG. 8 of the drawings, additional means are associated with the conveyor belt 22 or 22' as the case may be for effectively increasing the suctional area thereof and for providing additional accommodation relative to irregular surfaces adhered to the conveyor. The additional means also have the effect of increasing the sealing engagement between a carton 30' adhered to the conveyor and the flexible conveyor belt 22. In the arrangement of the invention as shown in FIG. 8 the conveyor belt 22' is provided with a closely fitting sheet or continuous belt 106 of open-cell elastomeric material, for example polyurethane foam, which is supported on the outward surfaces of the slats 52'. The interconnected cells of the overlying belt of foam material 106 have the effect of extending the area to which the pressure differential is applied, under static conditions as when an article 30' is adhered to the conveyor belt in engagement with a portion of the foam material 106. However, in those areas of the foam material 106 which are not covered by articles, the many open cells provide a tortuous path through which any leakage air must pass before it can enter the perforations 62' of each of the slats 52'. Thus, the sponge or foam layer 106 reduces the requisite pumping power for the vacuum conveyor and at the same time increases the total suctional force which can be applied to articles of a given size. Moreover, the thickness and the resiliency of the porous layer 106 affords an additional means for accommodating articles with irregular surfaces to the vacuum conveyor. By the same token, the softness and the resiliency of the open cell layer 106 provides an effective seal at the engagement of each of its small and closely spaced openings with the articles 30' lifted by the conveyor.

In many applications, it is contemplated that the lateral sealing gaskets 64 or 64' between the slats 52 or 52' can be provided only adjacent the end portions of the slats if so desired when the layer of the foam material 106 is provided thereover. It is also contemplated that independent sections or pieces (not shown) of the foam material 106 can be secured individually and respectively to the slats 52' for the purposes described previously in connection with the continuous porous layer 106. The aforementioned pieces of the open-cell material 106 are approximately the same shape as the slats 52' but desirably are slightly wider than the slats in order to ensure continuous and lateral sealing contact between adjacent pieces both on the belt runs and at the belt return portions, when used with the conveyor arrangement of FIGS. 6 and 7. The provision of discrete foam segments or pieces has the advantage of permitting removal or replacement of one or more of the slats 52' without the necessity of removing a continuous belt 106 of the foam material.

Another form of my novel, foraminous conveyor belt 110 for use in controlling differential pressures is shown in FIGS. 9 and 10. For purposes of illustration the belt 110 is shown in association with a pair of return rollers 112 and 114 forming part of a conveyor structure shown in detail in subsequent figures. In this example the belt 110 includes a perforated base layer 116, the ends of which are joined by clipper lacing 118 to form an endless belt. The perforated base layer 116 is covered with a superimposed layer 120 of open-celled foam material such as the polyurethane material described above. In this example, the foam layer 20 is applied with suitable thermosetting adhesive or other suitable adhesive known in the art for similar adherence purposes, taking care to avoid clogging flow apertures 122.

In an exemplary arrangement, the base layer 116 can be a three-ply canvas fabric or equivalent impregnated with rubber or other elastomeric material. The perforations 122, by way of illustration for a given application, are three-sixteenths inch in diameter and disposed on a 1-inch square lattice. For most applications, apertures of about one-half inch or less in diameter are suitable.

As better shown in FIG. 10 the foam layer 120 has the effect of spreading the pressure differential over the surface of the belt 110 owing to the interconnected cell construction thereof. Such open cell material is readily available. Furthermore, the open cell material 120 is available in differing degrees of resiliency for example a very soft foam or a relatively hard but still flexible foam.

When the belt 110 is employed with a vacuum conveyor adjacent the vacuum chamber 124 amplitude curve 126 and arrows 128 denote the variation in pressure differentials across the belt 110. Although the pressure differential varies to some extent along aperture center-to-center distances, it is readily apparent that pressure differentials exist at areas of the belt layer 116 between the apertures 122 which would not be the case in the absence of the foam 120. In an air lift conveyor, arrows 128 of course will be reversed in direction to denote a positive pressure differential, while amplitude curve 126 would remain relatively unchanged.

As better shown in FIG. 10A it is also contemplated that the foam layer 120' can be furnished in a relatively thick layer on the belt 110'. Accordingly, various shapes of indentations such as the indentation 130 can be formed in the foam layer 120' in order to accommodate articles such as article 132 being conveyed. It is not to be inferred that a molded surface must be furnished for irregular surfaces, since in many cases the resiliency of the foam will allow it to adapt to many irregular surfaces for example in the case of sheets of ordinary corrugated roofing. Moreover, the compression of at least the softer foam materials about the edge of either regular or irregular surfaces develops shearing forces in the foam material which tend to close the cells of the foam at these edges to minimize leakage around such surfaces. Any such peripheral leakage, which does occur, is short circuited to the nearest of the belt apertures 122 between the article and the article adhered thereto, and disposed inwardly of the peripheral apertures remaining intact.

As better shown in FIG. 10B it is also contemplated that the indentations 13' can be circular or hemispherical to accommodate rounded or spherical objects. In the latter arrangement apertures 122' can be aligned with the spherical or circular indentations 130'. It is also contemplated that the indentations can be extended entirely through the foam layer, as denoted by indentations 131, or FIG. 10D for direct communication with apertures 122' respectively.

In certain applications it is not essential that the foam material 120 of the preceding figures be continuous. For example, in FIG. 10C the foam material can be provided in the form of elongated strips 134 extending between adjacent rows of apertures 136, which may be spaced differently than that set forth in connection with FIG. 9 to accommodate the strips 134 in between. The strips can be extended longitudinally in endless fashion about the belt 110' or alternatively, transversely thereof. In the latter case a pair of longitudinally extending strips (not shown) can be disposed respectively at the lateral edges of the belt 110 to prevent free flow of air between adjacent transverse strips.

In another arrangement of my novel foraminous belt structure 110', shown in FIG. 10E, I provide foam layer 120' with a yieldable coextensive backing member 135 having flow apertures 137 and a pressure-sensitive adhesive layer 139 for adhering the foam layer 120' to the perforated base layer 116'. The adhesive preliminary can be coated with a layer of wax paper (not shown) or the like which will not permanently adhere to the adhesive 139. The yieldable layer 135 can be stretchable cloth or a suitable elastomeric material having at least the elastic characteristic of the foam layer 120'. With this arrangement the foam layer 120' can be progressively adhered to the belt base layer 116' and the elastic properties of the foam layer 120' and its backing layer 135 can be utilized for minor displacements of the foam layer, if necessary, to ensure registry of the backing layer apertures 137 with the base layer apertures 122' respectively. In furtherance of this purpose, backing layer apertures 137 desirably are made somewhat larger than base member apertures 122'.

As shown in FIGS. 11 and 12 the differential pressure conveyor belt, in another arrangement, is provided in the form of a series of discrete parallel endless belt strips 138. The strips 138 are spaced laterally of one another by ribbed return rollers, one of which is designated at 140a. In this example, each of the endless strips 138 includes an apertured, impregnated base layer 140 or equivalent having a single row of longitudinally spaced apertures 142 disposed intermediate the lateral edges thereof, although multiple rows of apertures can be employed as required. A foam layer 144 of equivalent width is adhered to the outer surface of the base layer 140, as described above. The endless belt strips 138 are passed in sliding engagement with a vacuum chamber 146 having a plurality of elongated slots 148 in longitudinal alignment with the rows of apertures 142 of the strips 138 respectively. When air is pumped out of chamber 146 through conduit 150 as denoted by flow arrow 152 the unperforated lateral edges of each endless strip 138 are pressed into engagement with adjacent slats 154 defining slots 148 of the vacuum chamber, as better shown in FIG. 12. The use of a plurality of endless belt strips 138 minimizes the sliding friction of the belt strips upon the vacuum chamber slats 154, with attendant reduction of power requirement of drive means (not shown) for rotating the ribbed roller 140a. The ribs 156 of roller 140a maintain the desired separation between the belt strips 138, provide proper tracking for the belt strips and align the belt strip apertures 142 with the chamber slots 148 respectively.

Another advantage of this arrangement is that an extremely wide conveying surface can be constructed by means of strips 138 (which may be made wider with multiple rows of apertures) without the extreme difficulties encountered in tracking a single wide belt.

With reference now to FIG. 13 a more detailed form of my novel vacuum conveyor 158 is shown in combination with a differential pressure belt 160 similar to the belt 110 of FIGS. 9 and 10. The conveyor 158 is utilized for transferring articles 162 along the lower run of the belt 160 by vacuum adherence. Conveyor 158 thus includes a vacuum chamber 164 having mounted along the lower open facing thereof a plurality of relatively closely spaced, transversely extending rollers 166. Each of the rollers is mounted on antifriction means or bearings 168 mounted in the vertical sides 170 of the vacuum chamber as better shown in FIG. 14. Also as better shown in FIG. 14, the lowermost edges of the rollers 166 are flush with the under surfaces of sealing flanges 172 of the vacuum chamber 164.

Thus, the rollers and the lower lateral edges 172 of the vacuum chamber provide a supporting bed for the moving foraminous belt 160, which bed involved a minimum of sliding friction. Although the belt 160 is flexible the close spacing of the rollers 166 present any appreciable belt flexure therebetween. The lateral edges of the belt 160 at the lower run thereof remain in sealing sliding engagement with the under surfaces of vacuum chamber 172. Accordingly, a vacuum conveyor is provided by my invention which does not entail huge amounts of sliding friction as in previously proposed vacuum conveyors. The power requirements of electric gear motor or other suitable drive means 174 need not be appreciably increased. Drive means 174 is coupled to drive roller 176 about which a proper belt wrap is maintained by adjustable snub roller 178.

Alternatively, the drive arrangement 174—178 can be omitted and a second smaller vacuum conveyor (not shown) can be provided wherein a suction area of its belt is disposed in engagement with a like portion of the conveyor belt 160 of FIGS. 13 and 14. The aforementioned belt portions are disposed for movement in the same direction and the vacuum adherence of the aforementioned portion of the belt 160 to the drive conveyor belt is utilized for a driving engagement between the belt portions so that the small vacuum conveyor can be utilized to drive the belt 160 of the larger conveyor 158. The aforementioned vacuum drive conveyor can also be employed for a similar driving engagement with a conventional conveyor for similarly driving the belt thereof.

To withdraw air through vacuum chamber 170 and through the adjacent lower run of belt 160 a plenum housing 180 coupled to blower 182 through conduit 184 is mounted on the upper side of vacuum chamber 164 in communication therewith. It is contemplated of course that the vacuum chamber 164 can be increased in depth and the conduit 184 coupled directly thereto, as better shown in subsequent figures.

At the ends of the conveyor 158 the belt 160 passes over return rollers 186 and 188 and in turn is passed over plenum housing 180 by guide roller 190 mounted on vacuum chamber 164 and guide roller 192 mounted on the top of plenum housing 180.

Where a maintenance of a low noise level is important, the blower can be provided with a conventional muffler denoted generally by reference character 194. In operation, the conveyor is similar to my novel slat conveyor mentioned previously with the exception that the belt 160 is completely flexible thereby permitting use of conventional drive roller 176 and associated drive means.

Figure 15:
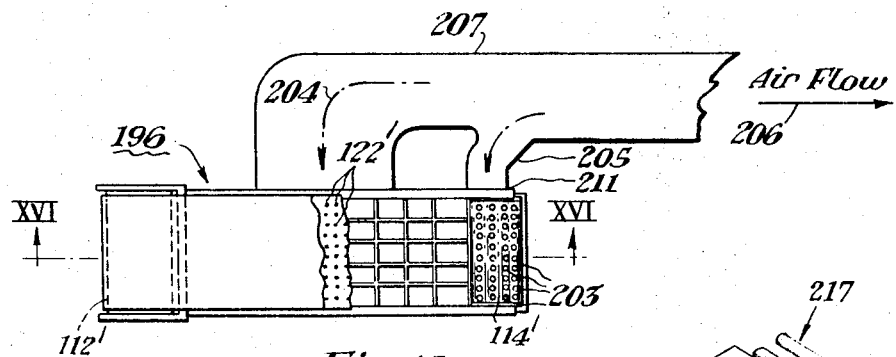
FIG. 15 is a top plan view, partially broken away, of still another form of my novel conveyor arrangement.
Figure 16:
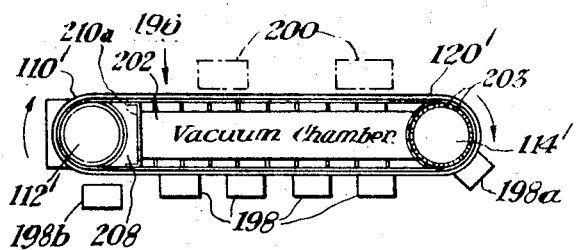
FIG. 16 is a longitudinally sectioned view of the apparatus shown in FIG. 15 and taken along reference line XVI–XVI thereof.

Another form 196 of my novel conveyor means is shown in FIGS. 15 and 16. The conveyor 196 can be employed either as a vacuum conveyor for articles 198 or as an air lift conveyor for articles 200 depending upon whether air is pumped out of or into vacuum chamber 202 and, of course, whether the vacuum chamber is provided with an open bottom or an open top. Belt 110' is similar to that described in FIGS. 9 and 10 and is supported on return rollers 112' and 114' with the roller 112' being powered by suitable drive means (not shown).

When the conveyor 196 is employed as an air lift or air float conveyor air is pumped into vacuum chamber 202 as denoted by flow arrow 204. The resulting pressure differential developed across belt 110' is sufficient to counterbalance at least part of the weight of the article 200. As a result conveyor 196 makes an ideal accumulator conveyor wherein a large number of queued articles thereon do not develop excess friction upon the belt as it is slid beneath the articles 200.

When air is removed from vacuum chamber 202 as denoted by flow arrow 206 then articles 198 can be adhered to the lower run of belt 110'. With the perforated belt roller 114' (described in detail below) and article 198a can be adhered at or near the right-hand belt return owing to the compressibility and depth of foam layer 120'. The article is grasped and raised by the conveyor when brought into close proximity to the foam surface. The resulting depression of the article into the foam layer and the shear forces applied to the foam seal off most of the interconnecting foam cells at the edges of the article to reduce leakage around the article. As the leftmost article 198b reaches the area 208 of the conveyor 196 beyond end wall 210a of vacuum chamber 202 the article 198 is released from the conveyor onto a suitable take away or service conveyor, palletizer, or the like (not shown in FIG. 16).

Figure 16A:
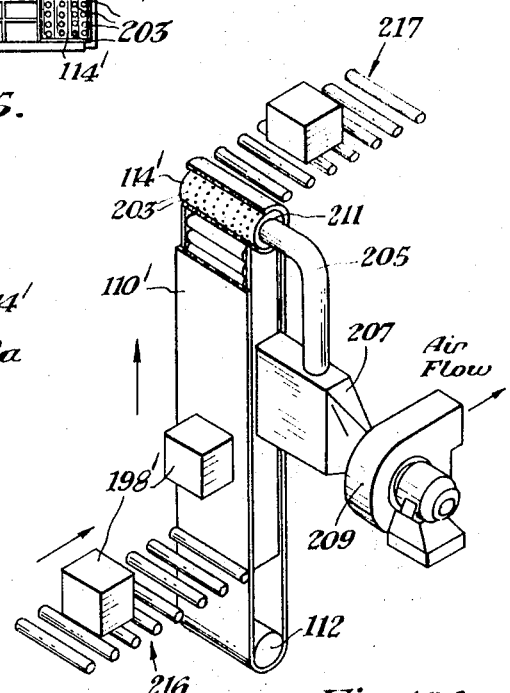
FIG. 16A is a similar vacuum conveyor arrangement for elevating articles either vertically or along a steep incline.

At least in those applications wherein the conveyor 196 of FIGS. 15 and 16 is employed as an elevating conveyor as shown in FIG. 16A it is contemplated that a pressure differential be applied to at least one belt return thereof, for example at return roller 114'. As better shown in FIGS. 15, 16 and 16A the roller 114' is provided with a large number of perforations 203 which are relatively larger and more closely spaced than the belt perforations 122' to minimize the probabilities of the belt apertures 122' overlying solid material of the perforated roller 114' as the belt passes thereover.

Air is withdrawn from roller 114' to develop a pressure differential across the adjacent area of the belt 110' by means of side conduit 205 coupled to exhaust conduit 207 which in turn is connected to outlet of blower 209. Side conduit 205 is coupled to roller 114' through a conventional rotary seal at 211.

This arrangement enables articles 198', delivered from supply conveyor 216, to be elevated in a vertical or steeply inclined direction to service conveyor 217. In the course of the elevation, articles 198 remain adhered to belt 110' as the latter passes over the upper return roller 114'. It is contemplated that the hollow apertured roller 114' be provided in sufficient size and that the softness and depth of the foam layer is such that the articles remain sealed to the belt 110' despite the curvature thereof about the roller 114', as explained above.

It is also contemplated that articles can be transferred from a vertical path to a horizontal path without the necessity of the perforated end roller shown in FIG. 16A. In the latter arrangement the articles, after being conveyed vertically by the conveyor of FIG. 16A, can be engaged by the lower surface of a second vacuum conveyor (not shown) disposed horizontally. Thus, the articles can be elevated by the vertical vacuum conveyor such as the conveyor 110' in FIG. 16A and then conveyed horizontally by the second vacuum conveyor to its discharge end and thence delivered to a conventional conveyor or other conveying means.

Figure 17:
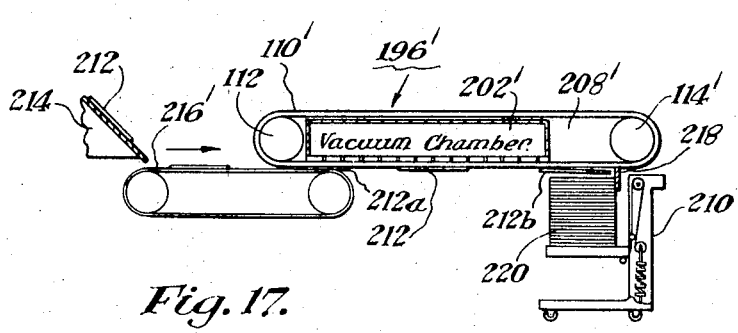
FIG. 17 is a longitudinally sectioned view of still another form of vacuum conveyor of my invention including a novel palletizing arrangement.

As better shown in FIG. 17 the article-raising characteristic of the foam layer discussed in connection with FIG. 16 makes the vacuum conveyor 196 admirably suitable for stacking or palletizing operations in conjunction with a spring actuated, self-levelling stacker 210, or other suitable stacker. In this operation articles such as flat sheets 212 are delivered for example from production machine discharge chute 214 to production conveyor 216 one end of which is closely spaced beneath the adjacent end of the conveyor 196'. As each article such as article 212a reaches that portion of belt 110' covering the lower open side of vacuum chamber 202' the article 212a rises slightly and becomes adhered to the lower run of conveyor 196' and is then carried thereby to stacker 210 or other means of disposition. As the articles reach the position denoted by article 212b the articles are released from the vacuum conveyor as shown in FIG. 17. The momentum of the released articles carries them against stop 218 in order to form an aligned stack 220 of the articles 212.

There is little or no pressure difference across the belt 110' adjacent the conveyor portion 208' between the right-hand end of chamber 202' and return roller 114'. Of course, the length of space 208 (FIG. 16) or 208' (FIG. 17) will depend upon the length or size of the articles 198 or 212.

Figure 18:
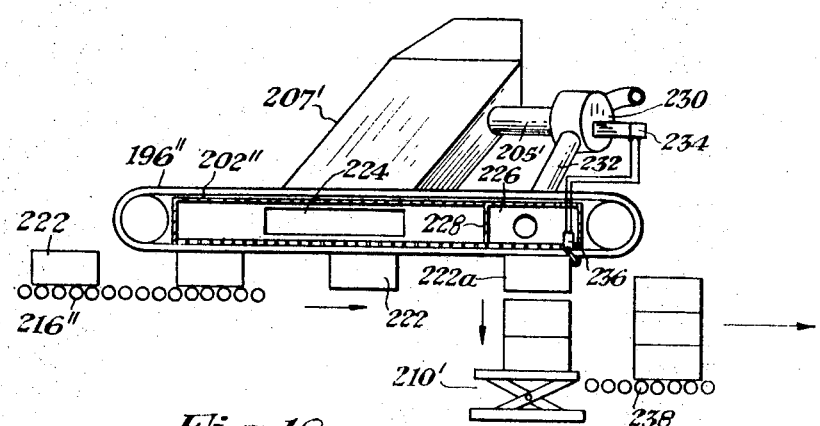
FIG. 18 is a generally similar vacuum conveyor and stacking arrangement with modified means for releasing the articles adhered to the conveyor.

Another stacking or palletizing arrangement is shown in FIG. 18 involving a modified vacuum conveyor 196'' and a modified stacker arrangement 210'. In this arrangement delivery conveyor 216'' is similarly spaced beneath the adjacent end of vacuum conveyor 196'' according to the size of articles 222 being transferred. In this arrangement vacuum chamber 202' is divided into two compartments, an elongated transfer compartment 224 and a relatively short release compartment 226, by means of an impervious partition 228. Air is withdrawn through compartment 224 and 226 by duct arrangement similar to 205, 207 of FIGS. 15, 16 and 16A. The chamber compartments 224, 226 are coupled respectively to exhaust and side ducts 207' and 205'. A three-way dump valve 230 is coupled in side duct 205' with the third port 232 of the dump valve 230 being vented to the ambient.

Desirably, the three-way dump valve is solenoid 234 being controlled by limit switch 236 when engaged by the articles 222 as they successively reach the position of article 222a.

The dump valve 230 and the associated conduits are sized such that when the valve is manipulated to couple release chamber 226 to vent 232 (thereby interrupting the the flow of air through side conduit 205' to duct 207') the differential pressure in release chamber 226 is immediately equalized thereby releasing article 222a. When a stack of articles 222 reach a suitable height, stacker 210' is manipulated to deliver the articles to service conveyor 238.

Figure 18A:
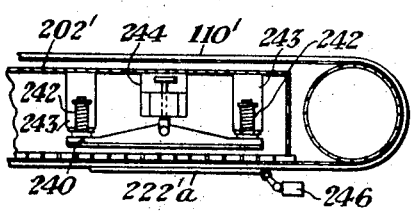
FIGS. 18A and 18B are enlarged, partial, longitudinally sectioned view illustrating another form of my novel release means.
Figure 18C:
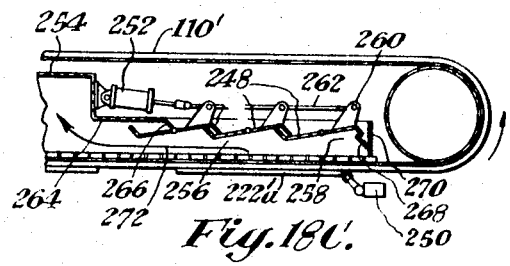
FIGS. 18C and 18D are similar views illustrating still another form of my novel release means.
Figure 18B:
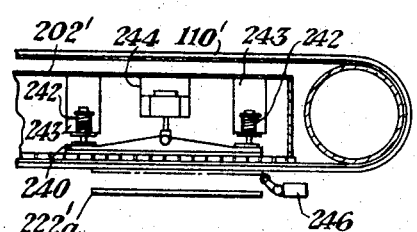

Another form of my novel release means for equalizing pressure differentials at a release area of the flexible belt 110' is illustrated in FIGS. 18A and 18B. In the latter arrangement a plate 240 equivalent to the desired size of the release area of the belt is normally poised adjacent the inner surface of the belt release area by means of biasing springs 242 and spring housings 243. The plate 240 is coupled to suitable actuating means 244 mounted within the vacuum chamber 202' for depressing the plate 240 into engagement with the belt 110' a sliding engagement will obtain, of course, when the belt is moving. Actuating means 244 can take the form of an electric solenoid actuated by limit switch 236 through suitable circuitry (not shown). Alternatively, a hydraulic or pneumatic cylinder (not shown) can be employed.

In operation, when the release plate 240 is in its raised position (FIG. 18A) the area of the belt directly beneath the plate 240 is subjected to the pressure differential in the interior of the vacuum chamber 202'. On the other hand when the release plate 240 is urged against the back side of the belt (FIG. 18B) the flow of air between the plate and the release area of the belt 110' is terminated and the pressure differentials developed thereacross are eliminated. Of course, only a momentary engagement between the belt 110' and plate 240 is necessary as the small but normal leakage through the foraminous belt quickly equalizes any differential pressure between the belt 110' and article 222'a.

Figure 18D:
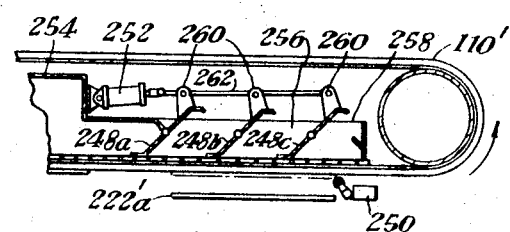

A similar belt release arrangement is shown in FIGS. 18C and 18D, which utilizes one or more dampers 248 controlled by limit switch 250 and solenoid or cylinder 252 coupled to the switch 250 through suitable circuitry (not shown). When the damper or dampers 248 are opened as shown in FIG. 18C the vacuum chamber 254 in effect is provided with an extended compartment 256 overlying the release area of the belt 110' as denoted by the position of article 222'a (FIG. 18C). The damper or dampers 248 are pivoted, in this example, at their central axis or axes to sidewall extensions 258 of the vacuum chamber 254 and the damper or dampers are rotated by their brackets 260 joined to connecting rod 262 and thence to solenoid or cylinder 252.

The roof or vacuum chamber 254 is provided with an extension 264 and depending flange 266 which closely engages the adjacent damper 248 at its pivot axis to minimize leakage thereat. When the dampers are opened as in FIG. 18C the dampers overlie one another with the outermost damper overlying a lip 268 disposed on end wall 270 of the chamber extension 256. This arrangement permits communication between the vacuum chamber 254 and the release area of the seal 110' as denoted by flow arrow 272.

On the other hand when the dampers are closed as shown in FIG. 18D the damper or dampers 248 are pivoted so that the damper 248a which engages the roof extension 264 is disposed with one of its lateral edges in engagement with the moving belt 110'. This action seals off the balance of the chamber release compartment 256 and quickly equalizes the differential pressure previously existing across the belt release area. As a result article 222'a drops from the belt. Although three dampers 248 are shown in FIGS. 18C and 18D it will be obvious that a greater or lesser number can be employed depending upon the longitudinal length of the release chamber 256. For example, dampers 248b and 248c can be eliminated and the end wall 270 and sealing lip 268 positioned for engagement with the adjacent lateral surface of the remaining damper 248a in those applications where only relatively small articles are handled by the conveyor.

As shown in FIG. 19 a vacuum conveyor 274 can be provided with a plurality of belt release areas or stations as denoted by a like plurality of release plates 240', described previously in connection with FIGS. 18A and 18B. It will be understood of course that other belt release means such as those described herein can be substituted The conveyor 274 in the arrangement of FIG. 19 can be utilized as a diverting and/or sorting conveyor wherein articles of differing categories, A, B, C and D are sorted and diverted onto conventional cross conveyors such as conveyors, A, B, C and D. An end of each of the conveyors is juxtaposed beneath an associated one of the release stations 240'. In this arrangement each of the release plates 240' are actuated by an electric solenoid 276.

For purposes of explanation it will be assumed that articles of four differing categories, A, B, C and D (although a different number of categories can be used) are delivered in random array on arrival conveyor 278 and that it is desired to sort these articles into corresponding cross or diverting conveyors A, B, C and D, each containing a predetermined single category of articles. In furtherance of this purpose each of the articles, A, B, C and D are suitably coded so as to cause photocells 280 to deliver a differing output pulse group on conductors 282 to discriminator 284 with each such pulse being related to a given category of articles.

The discriminator 284 consists of conventional circuitry for identifying the pulses for delivering output signals corresponding respectively to the pulse groups, categories and article. Thus in FIG. 19 discriminator 284 delivers an output signal on conductor 288b which is coupled to solenoid 276b of delivery station 240'b, inasmuch as the pulse group supplied by photocells 280 identifies the category of article 286 juxtaposed to the photocells. However, a delay network 290b is coupled to conductor 288b which delays the signal for a time equal to that required for the article 286 (category B) to reach the delivery station 240'b for release to diverter conveyor B.

In similar manner signals are delivered by the discriminator 284 to the conductors 288a, 288c, 288d and to delay networks 290a, 290c and 290d. Each of the delay networks introduces a differing time delay corresponding to the times that it takes articles of category A, B, C or D to traverse the distance from photocell pickups 280 to their respective delivery stations 240'a, 240'b, 240'c and 240'd. For example, in FIG. 19 the delay network 290d has just delivered an actuating signal to solenoid 276d to release article D, (denoted by reference character 292) onto the associated cross conveyor D. The time delay network 290d has held up the signal delivered to it by the discriminator when article 292 was previously positioned in place of article 286 at the photocell pickup 280. Thus, the diverting and sorting arrangement of FIG. 19 provides a quick and automatic means for sorting and categorizing articles.

The use of the vacuum conveyor in a novel unstacking or depalletizing arrangement is shown in FIG. 20. In this arrangement unstacker 294 need not be provided with conventional vertically indexing lift means. This is made possible by the compressibility of the foam layer provided on conveyor belt 110' and discussed above with reference particularly to FIGS. 15—17 and 16A. As shown in FIG. 20 when the uppermost sheet or article 296 of stack 298 is engaged by the adjacent surface of the belt 110' the article 296 is raised and separated from the stack 298 by the negative differential belt pressures applied thereto, and the resulting compression of the foam belt layer 120' by the forces developed as a result of the differential pressure. This separation is sufficient that the uppermost article 296 is raised and moved horizontally from the stack 298 before the unstacker 294 raises the stack sufficiently to engage the next lower article with the belt 110'. In addition to permitting the use of a continuously moving unstacker 294 the raising and separation of the uppermost article 296 permits removal thereof without marring or scratching adjacent surfaces of the articles. It is also contemplated that sheets of protective material such as porous paper can be interleaved with the stack of articles 298. Then, the pressure differential across the belt 110' will be transferred through the porous paper or the like to the article on which protective paper is overlaid.

As the articles are unstacked they are moved to the right by vacuum conveyor 196' until the articles successively pass beyond the right end 300 of vacuum chamber 202'. In the area 302 of the conveyor 196', which desirably is sized in accordance with the size of articles 298 or the largest size of articles to be transferred, there is little or no differential pressure and the articles are released to drop onto service conveyor 304. If the length of sheet or carton is very long so that interference with the next lower article would occur, a conventional, intermittent lift will, of course, be used.

In FIGS. 21 and 22 a novel unstacking and unscrambling arrangement is illustrated. In this example stack 298' includes layered and rowed groups of articles which must be unstacked and delivered singly or unscrambled to service conveyor 306 or other conveyor means. In the arrangement of FIGS. 21 and 22 a conventional indexing unstacker 308 is employed and is operated such that the layer 310 of the stack 298' is closely spaced beneath the vacuum belt 110'. An unscrambling plate 312 is inserted between the layer 310 and the moving belt 110'. The plate 312 is fitted into grooves in lateral supporting brackets 314 and is connected to the distal end of piston rod 316 for horizontal withdrawing movement by cylinder 318. The other end of plate 312 is provided with an inclined edge 320 so that as the plate 312 is withdrawn it successively and singly uncovers articles 322 in each row comprising the layer 310. As each article 322 is uncovered by the unscrambling plate 312 it becomes immediately adhered to the belt 110' and each row of articles is successively staggered across the belt as better shown in FIG. 22. Alternatively as shown in FIGS. 21 and 22, the articles 322 are transported by the vacuum conveyor 324 to its release area 326 where the articles drop one by one upon skewed roller section 328 of the service conveyor 306, the rollers of which can be driven by conventional means (not shown), if desired. The skewed rollers cause the articles to move toward side or aligning rail 330 along which they are delivered in aligned, single file to exit portion 332 of the service conveyor 306.

If desired, the unscrambling plate 312 can be omitted and each layer of articles 322 can be picked up and carried as a unit by vacuum conveyor 324, operating at lower speed, to a longer skewed roller section (not shown) than that illustrated at 330. The longer skewed roller section desirably is operated at a relatively high speed which then effects both separation and alignment of the articles 322.

Alternatively, the staggered array of articles on vacuum conveyor 324 can be singly delivered to a cross conveyor indicated at chain outline 333 in FIG. 22, for single-file delivery therealong.

It is contemplated that my novel vacuum or air lift conveyor arrangements may accumulate dust or other foreign matter in the foam layer of the foraminous belts after longer or shorter periods of time depending upon the environment in which they are used. In the case of air lift conveyors such accumulation can be minimized or eliminated altogether by the provision of suitable filters in the ductwork between the blower and the air chamber of the conveyor. On the other hand, in the case of vacuum conveyors such filtering is difficult if not impossible, except within a carefully controlled environment or by alternate use of the hooded arrangement (FIG. 27) described hereinafter.

Figure 23:
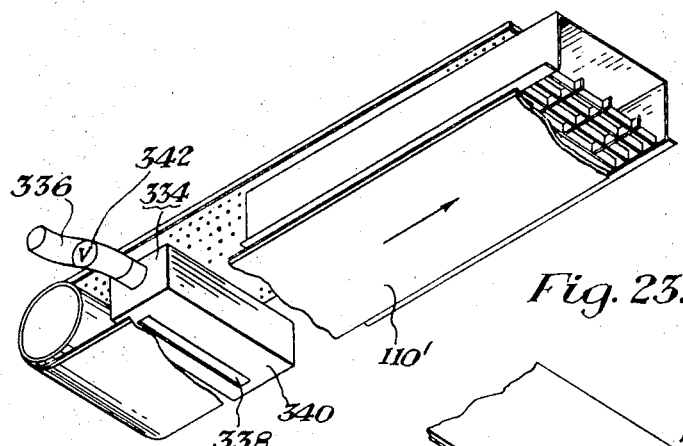
FIG. 23 is a partial isometric view, with parts broken away, of a novel cleaning arrangement for use with my vacuum and air lift conveyors.

Accordingly, in FIG. 23 I have provided novel means for periodically or continuously cleaning the foraminous belt, as required. In this arrangement a vacuum conveyor is provided with an independent pressure chamber 334 coupled to the outlet or exhaust of the blower (not shown) through duct 336. Pressure chamber 334 is provided with an outlet slot 338 extending substantially transversely across the width of the belt 110' and juxtaposed thereto. It is contemplated that the belt will slidably engage the adjacent face 340 of the pressure chamber to prevent the exit of air therefrom otherwise than through the foraminous belt. A throttling valve 342 desirably is coupled in conduit 336, which valve can be left open to a predetermined degree for a continuous cleansing flow of air through the belt 110' or can be operated intermittently for periodic cleaning purposes. If desired, the pressure chamber 334 can be positioned at the delivery area of the belt 110 or 110' (such as delivery areas 208, 302, or 326 of FIGS. 16, 20 or 21 respectively) to facilitate release of articles from the belt or to forcibly release articles for any desired purpose.

Figure 24:
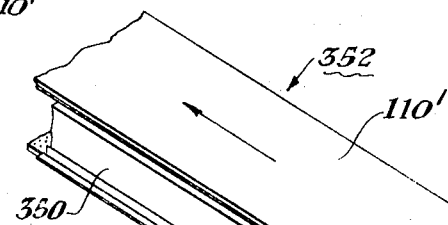
FIG. 24 is a similar isometric view of another form of my novel cleaning arrangement which also can be used as quick- or forced-release means in certain applications.

Another form of my novel belt-cleansing apparatus is shown in FIG. 24 of the drawings. In this arrangement a perforated roller 344 having one or more longitudinal brush members 346 thereon is mounted adjacent one of the conveyor belt returns or at other noninterfering locations. The apertured roller 344 is rotatably mounted and is coupled through a rotating seal denoted at 345 to duct 348 in turn connected to vacuum chamber 350 of conveyor 352. The roller 344 is rotated by engagement with the conveyor belt 110', and dust and other foreign material loosened in this fashion is picked up by air flowing inwardly through the apertures of the roller. If desired, a cleaning solution can be poured into container 354 therefor.

Figure 25:
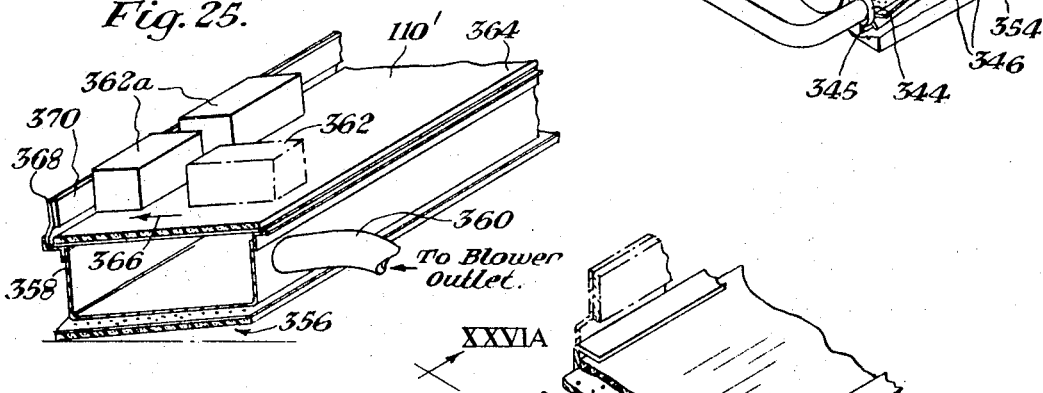
FIG. 25 is a partial isometric view of a novel form of air lift and alignment conveyor arranged in accordance with my invention.

A novel form of my air float conveyor is illustrated in FIG. 25 and arranged for alignment purposes. In this example the conveyor 356 is provided with a foraminous belt such as the belt 110' and a pressure chamber 358 similar to the pressure chambers mentioned previously with the exception that inlet duct 360 is coupled to the outlet of a blower (not shown). In addition the conveyor structure including the belt 110' is tilted about its longitudinal axis toward a side of the conveyor. Thus, elongated articles such as article 362 delivered adjacent the upper lateral edge 364 of the air lift conveyor 356 tend to slide transversely across the conveyor owing to the air lift or air float characteristic in the direction denoted by arrow 366 toward the lower lateral side of the conveyor where articles such as article 362a engage alignment rail 368 coextending with the air lift portion of the conveyor 356. If desired, the rail 368 can be provided with a friction pad 370. When the elongated article 362 engages the rail 368 in an endmost fashion, its position becomes unstable owing to the interplay of frictional forces associated with the stationary rail and the moving belt. As a result the articles are each moved into stable positions with their long axes aligned with the rail 368. Thus, the tilted air lift conveyor 356 performs the functions of the skewed roller portion 330 of the service conveyor 306 in FIG. 22 and can be substituted therefor as desired. The movement of articles across the conveyor 356 in the transverse direction is facilitated by the considerable reduction in frictional forces which are counterbalanced by positive pressure differentials acting through the foraminous belt 110'.

Figure 26:
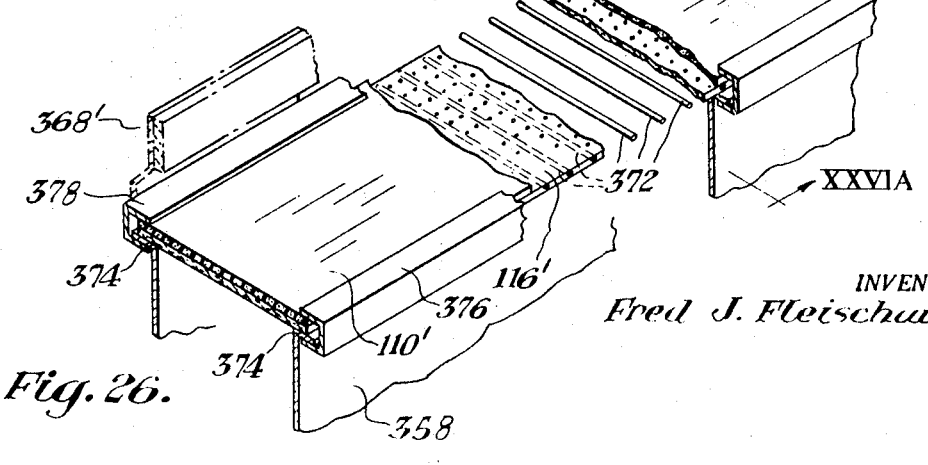
FIG. 26 is a partial isometric view with parts broken away, of another form of my novel conveyor belt, suitable for use with either vacuum or air float applications, and provided with edge sealing means.

In those applications wherein the pressure differences across the air lift or foraminous belt 110' (FIG. 25) are sufficient to cause the belt to flex outwardly stiffening means such as that shown in FIG. 26 can be employed. Such transverse stiffening means can also be employed in the vacuum conveyor of FIG. 13 or vacuum conveyors where the support rollers 166 or the like are omitted. One form of such means includes the provision of transversely extending stiffening rods 372 spaced equally along the length of the belt 110'. The rods 372 can be imbedded in or secured to the side surface of the base or fabric layer 116'.

Figure 26A:
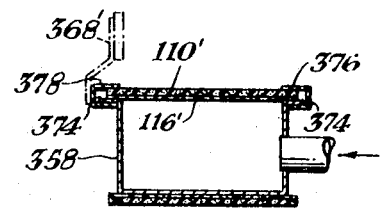
FIG. 26A is a partial cross-sectional view of the air lift conveyor shown in FIG. 26 and taken along reference line XVIA–XVIA thereof.

Under similar conditions it is necessary to provide positive means for sealing the lateral edges of the belt 110' to upper flanges 374 of the air pressure chamber 358. As better shown in FIG. 26A one arrangement for accomplishing this includes the provision of a pair of channeled brackets 376 and 378 which underlie and overlie respectively the flanges 374 and the juxtaposed lateral edges of the belt 110'. Where the conveyor of FIG. 26A is employed in air lift applications as an alignment or unscrambling conveyor, an alignment rail 368' can be secured to one of the channel brackets such as the bracket 378.

It is also contemplated by my invention that either an air lift or vacuum conveyor such as those described herein can be arranged such that the positive or negative pressure differences across the foraminous belt can be enhanced while at the same time the volumetric load on the blower or compressor can be reduced.

Figure 27:
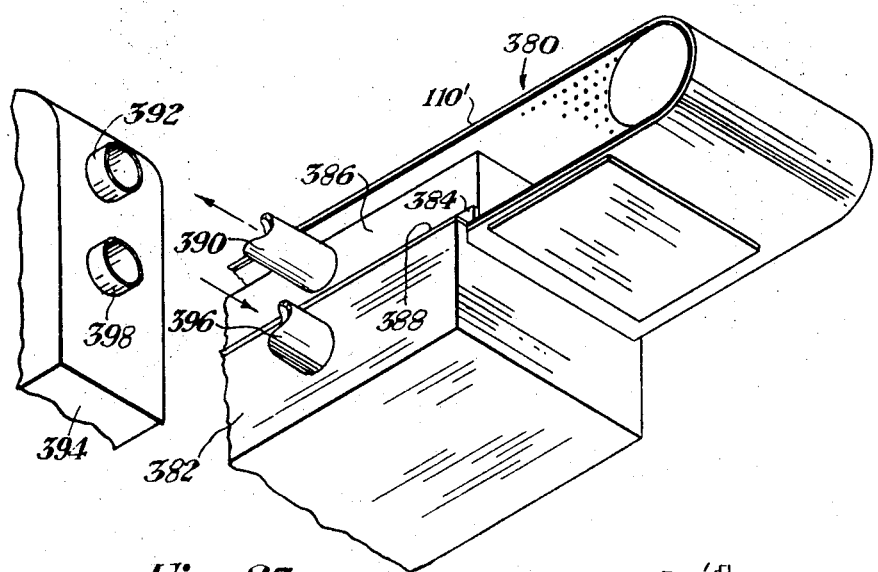
FIG. 27 is a partial isometric view of another vacuum conveyor arranged in accordance with my invention with means for increasing the differential pressure thereof and for reducing the volumetric load on the compressor or blower associated therewith.

In the case of a vacuum conveyor 380 as better shown in FIG. 27 the article supporting run thereof is enclosed within pressure hood 382. Adjacent the ends thereof the pressure hood 382 is provided desirably with access and delivery ports for admitting and exiting articles with a minimum of leakage. Such ports desirably closely fit about the articles which can be aligned and closely spaced to reduce leakage through the ports. Thin sheet materials enter and leave the hood by means of the normal clearances left between the belt means and the adjacent edges of the hood structure.

In this arrangement pressure hood 382 is mounted by a pair of brackets 384 secured respectively to the sidewalls of vacuum chamber 386. Each of the brackets 384 desirably is provided with a horizontal run portion 388 which is engaged by the adjacent lateral edge of the belt 110' to form a sliding seal.

Vacuum chamber 386 is coupled through duct 390 to inlet 392 of blower 394, while the pressure hood 382 is coupled through duct 396 to outlet 398 of the blower 394. With this arrangement the blower exhaust is not dumped to the ambient or to external equipment but rather is circulated continuously through the vacuum conveyor. In addition to eliminating the buildup of foreign matter this recirculation reduces the volumetric requirements of the blower system while at the same time it increases the pressure differential across the foraminous belt 110'.

A similar arrangement for an air lift conveyor 400 is illustrated in FIG. 28 wherein a pressure chamber 402 of the air lift conveyor is coupled through duct 404 to the blower outlet, and vacuum hood 406 is connected through duct 408 to the blower inlet. In a similar manner the volumetric requirement of the blower is reduced while the positive pressure differential across the foraminous belt 110' is increased. Desirably, additional angle brackets 410 are provided to retain the lateral edges of the belt 110' against the horizontal webs of the brackets 388'. Desirably also, the foraminous belt 110' is provided with the reinforcing means of FIGS. 26 and 26A.

Referring now to FIG. 29 another arrangement for decreasing the volumetric blower load is illustrated. In this arrangement vacuum conveyor 412 is provided with vacuum chamber 414 which in turn includes automatically actuatable valve means 416 associated with the lower otherwise open side thereof. The valve means 416 includes a plurality of closely spaced, hollow frustoconical sections 418 in each of which a properly weighted ball member 420 is retained between the constricted inner opening 422 thereof and the inner surface of foraminous belt 110'.

Each of the balls 420 are weighted such that the normally small, initial leakage of air through uncovered portions of the belt 110' draw the juxtaposed balls 420 into the constricted openings 422 of the associated frustoconical sections 418 to prevent further escape of air therethrough. The constricted inner openings 422 communicate with the interior of the vacuum chamber 414, although frustoconical sections 418 are illustrated any suitable funnellike member of suitable shape can be employed. On the other hand, the much smaller leakage flow past those balls such as the balls 420a juxtaposed to an adhered article 423 is sufficient to raise the balls 420a and the latter remain free of the constricted openings 422 of the associated frustoconical sections 418a such that the negative pressure differentials are applied directly and essentially staticly to the adhered surface of the article 423. As pointed out previously there is virtually no leakage of air around the edges of the article 423 owing to the sealing characteristics of the foam layer 120' when subjected to shearing forces developed by depression of the article 423 into the foam layer as a result of negative or adherence pressures. As the article 423 is moved along the conveyor the valve means directly ahead of the article 423 are successively closed when covered by the article 423, while those directly beyond the article are successively opened so that the article remains adhered to the belt as it moves relative to the vacuum chamber 414. Where the vacuum conveyor of FIG. 29 is disposed vertically (not shown) the balls 420 can be mounted on lightly biasing springs (not shown) which normally urge the balls away from the holes 422 but permit the balls to be drawn into the holes by the normal leakage through uncovered belt portions.

In any of the vacuum conveyors disclosed herein it is contemplated that the open or flow side of the vacuum chamber can be at the upper run of a horizontal conveyor structure, and the structure employed as an oscillating conveyor. In this case, the negative pressure differential is intermittently applied to the vacuum chamber (as by a damper or a three-way valve system similar to that of FIG. 18) during only the acceleration of the articles to adhere the articles to the oscillating structure and to permit a considerable increase in such acceleration. When the conveyor reaches the forward limit of each oscillation the differential pressure is equalized so as not to interfere with sliding of the articles. Alternatively, the differential pressure can be changed from negative to positive (for example by parallel, relatively reversed flows and suitably valved ductwork) at the end of the forward oscillation to prolong greatly the slide of the articles. The conveyor can otherwise be oscillated in the conventional manner.

A vacuum conveyor can be employed with suction applied to the top run to maintain present positions of conveyed articles, in the presence of vibration or other forces, tending to displace the articles, for sorting purposes, etc.

A vacuum conveyor such as that shown in FIGS. 1—8 or FIGS. 15, 16, 16A can be employed to eliminate conventional up-ending machinery in many applications. In this application both upper and lower sides of the vacuum chamber are open and at least one perforated belt return roller or equivalent is provided. Thus, articles can be inverted by transfer from the lower belt run around one belt return to the upper belt run, or vice versa. Suitable arrival and service conveyors can be associated as required with the belt runs to deliver articles in one position to one of the runs and to remove articles in a relatively inverted position from the other. The latter run can be provided with one of the belt release means disclosed herein.

An air lift or air float conveyor of the invention finds useful application in conjunction with cross or diverter conveyors. The use of air float facilitates the mechanics of pushing articles transversely off the moving conveyor belt of the air lift conveyor and onto one or more cross conveyors. A pusher mechanism of much lighter construction can be employed in case of heavy articles. Moreover, belt wear is considerably reduced by the elimination of the major proportion of the sliding friction.

A vacuum or air lift conveyor of my invention can also be employed for transporting and simultaneously drying various materials by means of the normal leakage through my foraminous belt means. For articles of very light unit weight, such as foam material, one of my novel vacuum conveyors is preferable in this application.

From the foregoing it will be apparent that novel and efficient forms of air lift and vacuum conveyors have been disclosed herein. Although the invention has been described with primary reference to specific forms and applications of my novel conveyor means, it will be readily apparent that the structural arrangements set forth herein can be adapted for use with other applications or combinations of conveyor functions. While certain presently preferred embodiments of the invention together with preferred methods of practicing the same have been shown and described herein, it is to be distinctly understood that the invention is not limited thereto but may be otherwise variously embodied and practiced within the scope of the following claims.

I claim:

1. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for moving said conveyor belt relative to said chamber structure, means for establishing a pressure differential within said chamber, a partition mounted in said chamber structure adjacent an end thereof and extended transversely of the open side thereof, branched conduit means coupled to said pressure differential means and respectively to said partitioned chamber end portion and to the balance of said chamber, and three-way valve means coupled in that conduit branch connected to said partitioned end portion, said valve means in addition being coupled to a vent conduit communicating with the ambient so that the pressure differential of said partitioned end chamber portion can be equalized with ambient pressure or otherwise changed independently of the remainder of said chamber structure for loading and unloading purposes.

2. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt being formed from a number of closely spaced planar slats supported transversely of the direction of movement of said belt, said slats being of foraminous construction and laterally interconnected one to another, each of said slats being flushly engageable adjacent its ends respectively and slidably with edges of said chamber structure at said one side to minimize leakage therebetween, a pair of conveyor belt pulleys rotatably and respectively mounted adjacent each end of said chamber structure at the return portions respectively of said belt, and at least one of said pulleys having a number of flat surfaces disposed flushly to engage adjacent ones respectively of said slats at the associated belt return to move said belt, the length of said flat surfaces being about equal to the width of said slats so that the lateral edges of said slats are not substantially separated as they pass around said pulleys, and means for rotating at least said one pulley.

3. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt being formed from a number of closely spaced perforated slats supported transversely of the direction of movement of said belt, and a mass of open-cell foam material secured to each of said slats and coextending at least therewith.

4. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt being formed from a number of closely spaced perforated slats supported transversely of the direction of movement of said belt, and a mass of open-cell foam material secured to each of said slats and coextending longitudinally of said slats, said foam material coextending with said conveyor belt as a continuous and endless belt overlying said conveyor belt.

5. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said chamber structure additionally being open at at least one end thereof, a pair of conveyor belt pulleys rotatably mounted adjacent each end of said chamber structure, at least one of said pulleys closely engaging adjacent wall portions respectively of said chamber structure and adjacent portions of said foraminous conveyor belt when passed thereover so that pressure differentials are applied to said adjacent belt portions, a partition member positioned within said chamber structure adjacent said one end thereof so that the end portion of said chamber structure including the compartment defined by said one pulley can be subjected to pressure differentials independently of the remainder of said chamber structure, and valved conduit means coupled between said compartment and said pressure differential means for establishing a pressure differential in said compartment independently of the remainder of said chamber structure.

6. The combination of claim 5 characterized further in that said valved conduit means includes a tubular shaft upon which the associated conveyor belt pulleys are spacedly and rotatably mounted, an intervening portion of said shaft being perforated to permit the flow of air therethrough relative to said compartment.

7. The combination according to claim 5 characterized further in that said valved conduit means includes a tubular shaft rotatably mounted on the adjacent end of said chamber structure and secured to the remainder of said conduit means through a rotary seal, the associated conveyor belt pulleys being spacedly secured to said tubular shaft for rotation therewith, an intervening portion of said shaft being perforated to permit the flow of air therethrough relative to said compartment, and the other end of said tubular shaft protruding beyond the adjacent pulley for engagement with rotating means secured thereto.

8. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt being formed from an endless flexible member having a number of flow apertures extending therethrough, and a layer of resilient open-celled foam material secured to said flexible member and coextending therewith, the open cells of said foam material being in communication with said flow apertures and with one another.

9. The combination according to claim 8 wherein said pressure differential means are capable of establishing a negative pressure differential with said chamber, and said pressure differential means and the resiliency of said foam material being correlated so that shearing and sealing forces are developed about the edges of an article adhered to said belt means.

10. An endless foraminous belt for a differential pressure conveyor, said belt comprising an endless flexible member having a number of flow apertures extending therethrough, and a layer of resilient open-celled foam material secured to said flexible member and coextending therewith, the open cells of said foam material being in communication with said flow apertures and with one another.

11. The combination according to claim 10 wherein said endless belt is provided with a plurality of transversely extending stiffening members secured to said flexible member to prevent outward transverse bowing of said belt when employed with an air lift conveyor.

12. The combination according to claim 10 wherein the securance of said foam material to said flexible member is provided by means of an apertured backing layer secured to said foam material and having an adhesive thereon for adherence to said flexible member, the apertures of said backing member being registrable with the apertures of said flexible member respectively.

13. The combination according to claim 12 wherein said backing layer is fabricated from an elastic material having at least the same elastic characteristics as that of said foam layer in order to permit minor elastic displacement of both said foam layer and said backing layer to facilitate registry of said apertures.

14. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential with said chamber, pressure equalizing means including at least one plate having generally the same shape as that of said belt release area, means for mounting said plate for movement within said chamber toward and away from said belt release area, biasing means coupled to said plate for urging said plate away from said belt area, and means for periodically moving said plate into a position adjacent said belt to close the juxtaposed apertures thereof.

15. The combination according to claim 14 wherein said moving means are operated by a limit switch mounted adjacent said release area for engagement with an article carried by said conveyor.

16. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, pressure equalizing means including damper means mounted within said chamber adjacent an opening adjacent said belt release area but removed from the surface of said belt, means for pivotally mounting said damper means adjacent said chamber opening and said belt release area, said damper in one pivoted position thereof closing said chamber opening so that said belt area communicates only with said chamber and in another pivoted position thereof closing a passage between said chamber and said belt release area so that said area communicates only with said chamber opening, and means for pivoting said damper means between said positions.

17. The combination according to claim 16 wherein said pivoting means are actuated by a limit switch mounted adjacent said belt release area for engagement with an article carried by said conveyor.

18. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said chamber one side being substantially covered with valve means, said valve means including a plurality of valve structures operable by a predetermined leakage rate through said belt so that those valve structures juxtaposed to an article carried by said conveyor remain open to apply said pressure differential to said article and those valve structures juxtaposed to uncovered areas of said belt are closed by initial leakage through said belt, whereby leakage through said belt open areas is minimized.

19. The combination according to claim 18 wherein each of said valve structures includes a funnel-shaped section having its more constricted opening communicating with said vacuum chamber structure and a ball member larger than said constricted opening and retained in said section by said conveyor belt means, each of said balls having means coupled thereto for biasing said balls away from its associated opening so that a normally small initial leakage of air through uncovered portions of said belt means close those juxtaposed ones of said valve structures by moving the associated ball members into the constricted openings of said juxtaposed valve members.

20. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said chamber structure being closed at both ends, a perforated roller for said belt rotatably mounted adjacent at least one of said chamber ends for establishing a pressure differential through said belt at an associated belt return, means for mounting said roller outside of said chamber structure but in general alignment with said one side in at least partial formation of said belt return, and branched conduit means coupled to said perforated roller and to said chamber structure for communicating said roller and said structure with said pressure differential means.

21. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt including a foraminous base member and a coextensive layer of open-cell foam material adhered to said base member.

22. A conveyor arrangement comprising an elongated chamber structure having flow means along at least one side, an endless foraminous conveyor belt means having a run thereof supported generally against said one side, said belt means having a relatively large number of flow-impeding openings therethrough communicating with said one side, means for moving said conveyor belt relative to said chamber structure, means for establishing a pressure differential within said chamber, said conveyor belt being formed from a number of closely spaced planar slats supported transversely of the direction of movement of said belt, said slats being of foraminous construction and laterally interconnected one to another, each of said slats being flushly engageable adjacent its ends respectively and slidably with edges of said chamber structure at said one side to minimize leakage therebetween, and a pair of flexible sealing means secured adjacent the sides respectively of said chamber structure and adjacent said chamber edges further to minimize or prevent leakage between said slats and said chamber structure.